United States Patent [19]

Iwasaki et al.

[11] Patent Number: 4,598,780

[45] Date of Patent: Jul. 8, 1986

[54] ELECTRONIC SCALE PRINTER

[75] Inventors: Yoshitaka Iwasaki; Kunio Mori; Yoshio Tanabe, all of Tokyo, Japan

[73] Assignee: Teraoka Seiko Co., Ltd., Tokyo, Japan

[21] Appl. No.: 705,533

[22] Filed: Feb. 26, 1985

[30] Foreign Application Priority Data

| Mar. 2, 1984 [JP] | Japan | 59-39844 |
| Mar. 2, 1984 [JP] | Japan | 59-39845 |
| Mar. 8, 1984 [JP] | Japan | 59-44876 |
| Mar. 8, 1984 [JP] | Japan | 59-33898[U] |
| Dec. 28, 1984 [JP] | Japan | 59-278899 |

[51] Int. Cl.⁴ .................. G01G 23/38; G01D 9/00
[52] U.S. Cl. .......................... 177/3; 177/1; 177/4; 346/9
[58] Field of Search .................. 177/2-13, 177/1; 346/9-12, 138

[56] References Cited

U.S. PATENT DOCUMENTS

| 4,101,366 | 7/1978 | Teraoka et al. | 177/3 X |
| 4,158,205 | 6/1979 | Jenkins, Jr. | 346/136 |
| 4,301,878 | 11/1981 | Soe | 177/5 |
| 4,440,248 | 4/1984 | Teraoka | 177/4 |

Primary Examiner—George H. Miller, Jr.
Attorney, Agent, or Firm—Sandler and Greenblum

[57] ABSTRACT

This invention provides an electronic scale printer, and more particularly an electronic scale printer in which a printer is connected electrically to the electronic scale used in a department store or supermarket etc., and required data are printed on a printing sheet under an instruction from the electronic scale and issued from the printer. The invention provides a printer capable of issuing both a label and a receipt through one printing means and more particularly an electronic scale printer in which either a label or a receipt corresponding to the kind of printing sheet stored in a cassette is printed and issued under proper replacement of the cassette having printing sheet for label stored therein with a cassette having a printing sheet for receipt stored therein.

32 Claims, 53 Drawing Figures

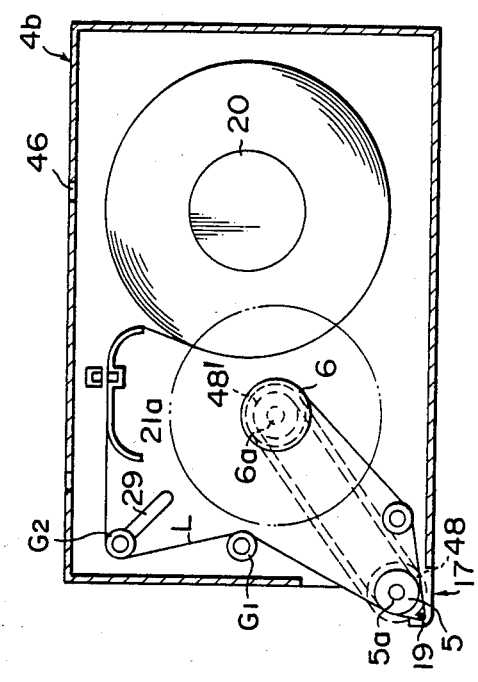
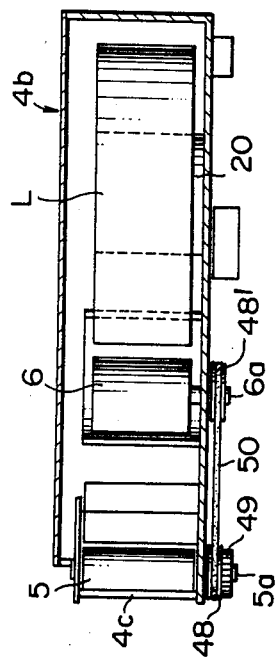
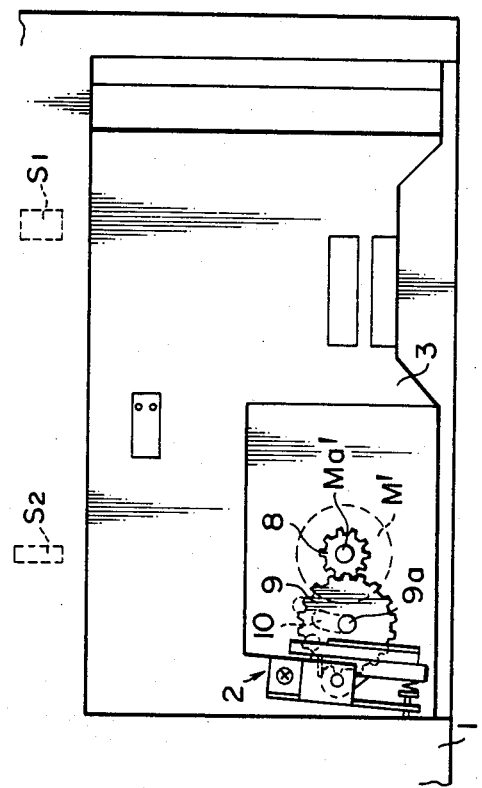

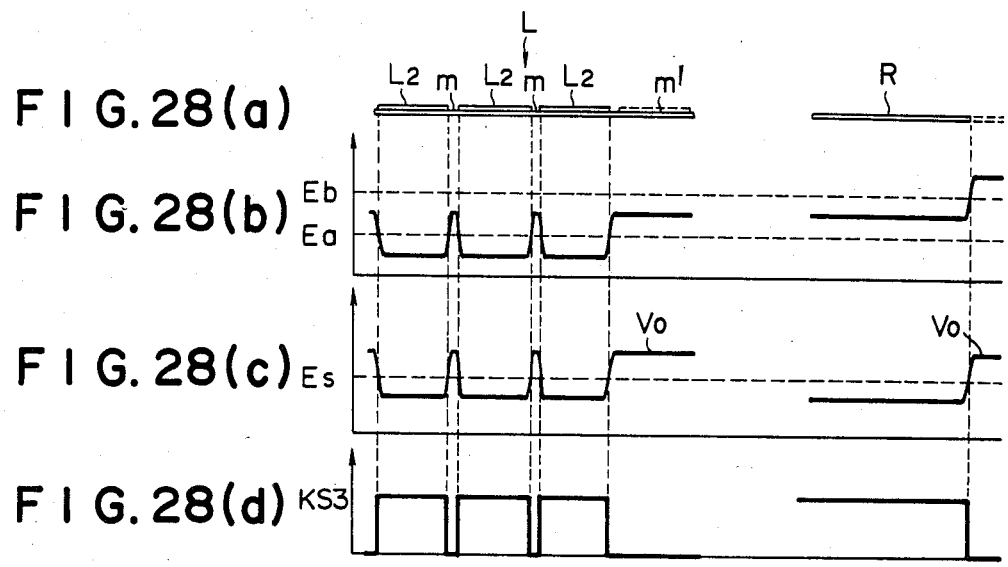
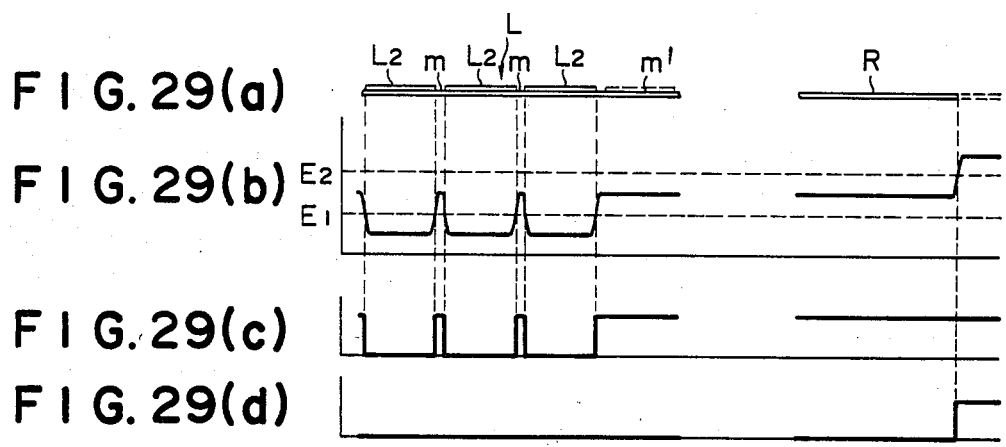

FIG. 33
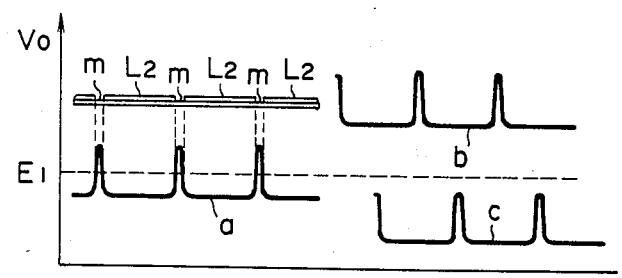
FIG. 34
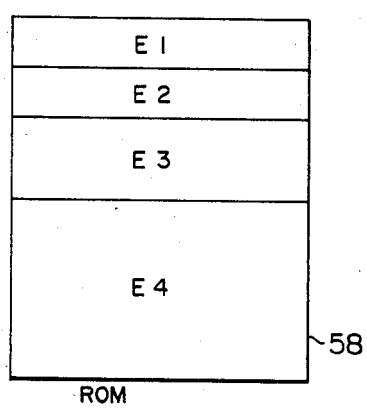
ROM
FIG. 36
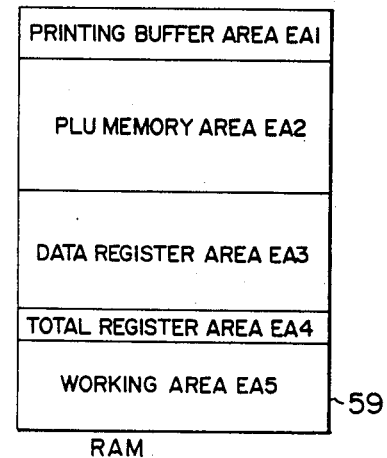
RAM
FIG. 37
| NO. OF ITEM | UNIT PRICE | APPRECI- ATION PERIOD | – – – – – | ITEM NAME FOR LABEL PRINTING | ITEM NAME FOR RECEIPT PRINTING |
|---|---|---|---|---|---|
|  |  |  | – – – – – – |  |  |
|  |  |  | – – – – – – |  |  |
|  |  |  |  |  |  |
| ¦ | ¦ | ¦ | ¦ | ¦ | ¦ |
| ¦ | ¦ | ¦ | ¦ | ¦ | ¦ |
| 0152 | 550 | 3 | – – – – – – – | ROAST BEEF STEAK | ROAST BEEF |
|  |  |  | – – – – – – |  |  |
EA2

FIG. 35(a)
FIG. 35(b)
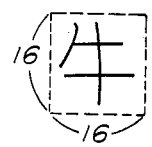
FIG. 35(c)
FIG. 38
| NO. OF ITEM | UNIT PRICE | --- | ITEM NAME FOR LABEL PRINTING | ITEM NAME FOR RECEIPT PRINTING | WEIGHT | PRICE |
|---|---|---|---|---|---|---|
| 0125 | 550 | --- | ROAST BEEF STEAK | ROAST BEEF | 200 | 1100 |
|  |  | --- |  |  |  |  |
|  |  |  |  |  |  |  |
|  |  |  |  |  |  |  |
TOTAL — NO. OF ITEMS EA4-1 — PRICE EA4-2 — EA4
FIG. 39(a)
FIG. 39(b)
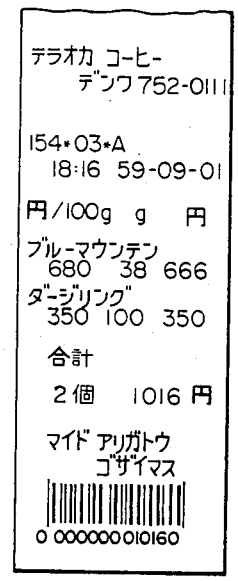

ELECTRONIC SCALE PRINTER

BACKGROUND OF THE INVENTION

1. Field of the Invention

This invention relates to an electronic scale printer, and more particularly a printer in which the printer is connected electrically to an electronic scale used in a department store or supermarket etc. and the desired data are printed in a printing sheet which is issued under an instruction from the electronic scale.

2. Description of the Prior Art

In the conventional type of an electronic scale printer used in a store such as supermarket, the unit has been applied for direct face-to-face selling between the customer and the store personnel and in one case that the receipt should be issued and in the other case that the label should be issued in accordance with the object of use of the unit.

However, the conventional type of the printer may be classified into two types: a label printer and a receipt printer for use in printing the desired printing mode on the desired printing sheet, that is, the weight of the article is weighed by an electronic scale, the price of the article is calculated in reference to the result of weighing and the unit price (price per unit weight), either one of the label or the receipt is issued in view of the result of calculation.

Although the two units have similar functions, a manufacturer should prepare two types of printers only due to the fact that they have different objects to be printed, resulting in that they are quite inefficient in their operation.

Also, the customer should replace the electronic scale itself or the printer causing an inconvenient practice when he desires to replace the receipt printer already in use with the label printer when, for example the size of the store was expanded. Further, for example, when a daily totalization is to be performed with the label printer, a separate exclusive totalization printer should be connected or the roll of used label sheets should be removed upon completion of the daily work to replace it with the roll of receipt sheets and to print out the accumulated data, resulting in a troublesome operation. Resetting the roll of label sheets upon printing-out of the accumulated data caused an issuing of useless labels, resulting in an uneconomical practice.

Since the printer was quite thin in view of its function and design, it was hard to perform a replacement of a roll of printing sheets upon completion of the roll of the printing sheets. Therefore, if the roll was completely used during meeting with a consumer, the store personnel must keep the consumer waiting for the replacement of the roll.

A way of displaying in the label to be attached to an item packed is defined under a rule of the Food Sanitation Act or the Food Fair Competition Rule etc. and the character of item name to be printed on the label is defined more than the desired size. In turn, the character of item name to be printed on the receipt (usually Japanese KANA character) is quite small in a usual ECR (electronic register) due to complicated printing item data or a sheet width of the printing sheets to be used. Thus, in the above-mentioned printer are applied characters in reference to the size of the sheet width. FIG. 39($a$) shows one example of a label and ($b$) illustrates one example of a receipt. As shown in the figure, the item name character N1 in the label is substantially larger than the item name character N2 in the receipt normally used, and therefore it is practically impossible to issue the receipt having the characters for a label or to issue the label having the characters for a receipt. In the conventional type of the printer, only one kind of item name was defined in correspondence with one item and thus it was impossible to issue both label a and a receipt.

SUMMARY OF THE INVENTION

It is an object of the present invention to provide a printer in which disadvantages of the prior art printer described above are eliminated and both labels and receipts can be issued with only one printing means, and more particularly an electronic scale printer in which a cassette storing a printing sheet for a label is properly replaced with a cassette storing a printing sheet for a receipt, whereby either a label or a receipt corresponding to the kind of printing sheet in the cassette is printed and then issued.

It is another object of the present invention to enable the item name characters to be printed under the same condition as that of the prior art label printer or receipt printer and to provide a practical electronic scale printer in which the item name code for a label and the item name code for receipts are stored in response to each of the item names stored in the memory in advance, and in case of issuing label where the cassette storing a label sheet is installed in the main body of the printer, the label is printed with the item name character pattern corresponding to the item name code for a label. In turn in the case of issuing receipt where the cassette storing a receipt is installed, the receipts is printed with the item name character pattern corresponding to the item name code for a receipt.

A fundamental arrangement of the printer of the present invention described above is made in an electronic scale printer in which the main body of the printer is electrically connected to the electronic scale, the desired data are printed on the printing sheet under an instruction from the electronic scale which is then issued. The cassette for storing the printing sheet for label or receipt is provided. The main body of the printer is provided with a mounting part whereby the cassette is removably arranged. Also each of the label printing control means and the receipt printing control means is provided as a printing control means, the above-mentioned control means can be selected in response to the kind of printing sheet stored in the installed cassette. A practical arrangement is constructed such that it may be provided with:

the first memory having the item name code for a label and the item name code for a receipt stored in correspondence with each of the items in advance, the second memory having several kinds of character patterns:

control means for reading out the above-mentioned item name code for label in response to an issuing instruction, transforming the read item name code for label into the character pattern through said second memory and outputting it to a printing part when the cassette storing said label sheet is installed in said cassette installing part, and in turn when the cassette storing said receipt sheet is installed at said cassette installing part, said item name code for said receipt is read out in response to the issuing instruction, the read item name code for receipt is transformed into a character pattern through said second memory and then outputted, and a printing part for printing said label sheet or receipt sheet.

The arrangement in which the replacement of the label sheet and the receipt sheet is performed under an installation of the cassette as described above has some mechanical and electrical problems to be solved in the sheet sensing means for detecting the position or presence or absence of the label or detecting the presence or absence of the receipt which are not reviewed in the conventional type of the label printer or receipt printer.

The mechanical and technical problems consist in the structure of the label position sensor.

In the conventional type of the label printer, as shown in FIG. 11, a label position sensor 70 having a transparent type photoelectric sensor is applied. The sensor is constructed such that a light emitting element 71 and a light receiving element 72 are stored and arranged at one end of the substantial ]-shaped prism 73. A label sheet L before printing is passed through a groove 74 formed at the other end of said prism 73, thereby either the front end or rear end of the label L2 is detected and the printing position of the label is controlled.

In the case where the above-mentioned detector 70 is arranged at the cassette installing part of the main body of the printer of the present invention, if the cassette is slid along the installing part to perform its installation, the presence of the detector may hinder the installation of the cassette. Thus, if the cassette is fitted over the installing part, an insertion and arrangement of the detector 70 in the cassette may be theoretically possible under an arrangement of opening at the bottom part of the cassette. However, in this case, it is difficult to perform a positive insertion of the label sheet L in respect to the groove 74 having the width 1 to be set at a quite small value under consideration of attenuation of light and it is not practical process.

Thus, it is yet another object of the present invention to eliminate the above-mentioned techanical problems and to provide an electronic scale printer having a structure of a label position sensing part without any troubles in installing and operation of the cassette and showing a superior practical and operative characteristic.

It is optional that the above-mentioned label position sensor performs the function of detecting the presence or absence of the receipt when the receipt is to be issued.

The present invention which should accomplish the above-mentioned objects is characterized in that a sensing element composed of a light emitting element and a light receiving element is arranged at the cassette installing part of the main body of the printer in the above-mentioned fundamental or practical constitution, a sensing part, through which the printing sheet is passed before printing is arranged at the position in said cassette where it faces against said sensing element, and the sensing part is provided with a reflection means for causing the light from said light emitting element to be crossed with a running passage of the printing sheet at one side thereof and then reflecting the light in such a direction as incidental to the light receiving element.

The electrical and technical problems found in the sheet sensing means are based upon the fact that the electronic scale printer of the present invention deals with both the label sheet and the receipt sheet and further the position, presence and absence of the label and the presence and absence of the receipt are detected by one sheet sensing means.

In order to clarify the technical problems more, one example of the receipt sheet and label sheet is shown in FIG. 7, wherein FIG. 7a illustrates one example of the receipt sheet R in which a thermosensitive sheet having a desired width is wound as a roll, FIG. 7b illustrates a part near terminal end of the label sheet L in which the thermosensitive labels L2, L2 . . . are adhered on the base sheet L1 and wound as a roll.

Between each of the labels L2 is formed a sensing slit m having a width of about 2 mm, and at the rear part of the final label L2 is also arranged a terminal end m' which has label L adhered thereon.

When the label L2 is to be printed, it is necessary to confirm the position of each of the labels L2. The check of the position is usually performed by sensing the thickness of sheet due to the fact that the part of label L2 is overlapped on the base sheet L1 to make a double sheet and the part of the slit m is occupied by the base sheet L1 only.

For example, as a sheet sensing means the above-mentioned passing-through type photoelectric sensor is applied and the label sheet L is passed between the light emitting element and the light receiving element, resulting in that the amount of passing-through light is decreased at the part of the label L2 and the amount of passing light is increased at the slit m, thus it is possible to judge the position of the label L2. That is, since the output of the light receiving element becomes "Low" level when the label L2 is sensed and the output becomes "High" level when the slit m and the terminal end m' are detected, it is possible to judge the presence or absence of the label by assigning "0"/"1" signals to these levels.

In turn, when the receipt sheet R is passed through said photoelectric sensor, an amount of passing-through light is decreased when the receipt sheet R is present and in turn increased when the sheet is not present, so that the presence or absence of the receipt sheet R may also be judged by this operation.

However, in this case, since the thickness of the base sheet L1 and the receipt sheet L or an amount of passing-through light substantially coincide, it is difficult to detect the label position and to detect the receipt sheet by one photoelectric sensor.

FIG. 29 is a view for illustrating the reason for the above case. FIG. 29a illustrates a condition of either the label sheet L or the receipt sheet R. FIG. 29b illustrates the output of the photoelectric sensor when these sheets L and R pass through the photoelectric sensor. FIGS. 29c and 29d illustrate a level of a two value signal detected when the slice level (a reference voltage of comparator: hereinafter called as a reference voltage) is defined as E1 and E2, respectively.

As is apparent from these figures, the output levels of the photoelectric sensor when the base sheet L1 and the receipt sheet R are present substantially coincide to each other (FIGS. 29a and 29b). When the label L2 is present, the value is decreased lower than the level when the base sheet L1 is present, and when the receipt sheet R is not present, it is increased more than the level when the base sheet L1 is present level. Therefore, the output level of the photoelectric sensor becomes a low (when the label L2 is present), medium (when the base sheet L1 or the receipt sheet R is present) and high (when the sheets R and L are not present) level, respectively. When the reference voltage is set to E1 under the presence or absence of label L2 so as to cause the signal level to be changed over to "0"/"1", the signal becomes "1" signal irrespective of the presence or absence of the receipt sheet R (FIG. 29c), and in turn when the reference voltage is set for example to E2 so as to cause the signal level to be changed over to "0"/"1" under the presence or absence of the receipt sheet R, the signal becomes "0" signal irrespective of the presence or absence of the label L2 in case of applying label sheet L (FIG. 29d). The results in that only either the position sensing of label L2 or the presence of absence of the receipt sheet R may be detected.

It is an object of the present invention to overcome the above-mentioned technical problems, providing a printer in which the sensing of label sheet and the sensing of receipt sheet can be performed with one sheet sensing means (sensor) and improve a practical characteristic of the electronic scale printer in which the label sheet is replaced with the receipt sheet.

The present invention to accomplish the above-mentioned objects is characterized in the under the above mentioned fundamental arrangement or practical constitution an output level of the sensor is varied in response to the condition whether the sheet installed in the main body of the printer is the label sheet or the receipt sheet or not.

Another electrical and technical problem found in the sheet sensing means consists in that there are several kinds of label sheets, thickness and rate of transparency are also versatile, so that the output level of the sheet sensing means (label position sensor) is varied in reference to the kind of label sheet.

FIG. 33 shows a wave-form illustrating this condition, wherein the wave-form shown by a symbol a is aligned in respect to the reference voltage E1, and in turn if the label L2 and the base sheet L1 are thin, its level is increased too much as shown by the wave-form b and if they are thick, it is decreased as shown by the wave-form c, so in both cases it is not possible to discriminate the label L2 from the slit m.

It is still another object of the present invention to overcome the above-mentioned technical problems and to provide an electronic scale printer in which the output level of the level position sensor (sensor) is automatically adjusted in response to the label sheet, the sensing of the label position may always be positively performed and a high accuracy is maintained.

The present invention to accomplish such objects as above has a change-over means for varying the output level of the sensor in a step-wise manner and a comparator for comparing the output signal from this sensor with the reference value under the above-mentioned fundamental arrangement or the practical constitution and has as its object to set the output level of the sensor in reference to the output of the comparator when the out put level is varied in sequence.

BRIEF DESCRIPTION OF THE DRAWINGS

FIG. 5b is a rear view of FIG. 5a.

FIG. 6b is a rear view of FIG. 6a.

FIGS. 16 to 21 illustrate some modified forms of the main body of the printer.

FIG. 16 is a top plan view of an installing part.

FIG. 17 is a sectional view of FIG. 16 with a part being broken away.

FIG. 18 is a sectional top plan view of a cassette.

FIG. 19 is a longitudinal section of the cassette.

FIG. 20 is a sectional view in top plan for showing an installing part where the cassette is installed.

FIG. 21 is a side elevational view of FIG. 20 with a part being broken away.

FIG. 28a is a view for showing a condition of the label sheet and the receipt sheet.

FIG. 28b is a view for showing an output level of the sensor S3 when the output level is not adjusted.

FIG. 28c is a view for showing the output level of the sensor S3 after the output level is adjusted.

FIG. 28d is a view for showing the wave-form of a signal KS3 produced from the comparator 62.

FIG. 29a is a view for showing a condition of the label sheet and the receipt sheet.

FIG. 29b is a view for showing an output wave-form of said sensor when each of the sheets is passed through a photoelectric sensor.

FIG. 29c is a wave-form when the output wave-form is sliced by the voltage E1 shown in FIG. 2g.

FIG. 29d is a wave-form when the output wave-form is sliced with the voltage E2 shown in FIG. 29b.

FIG. 33 is a view for showing a variation of the output level of the sensor S3 in reference to the thickness of the label sheet.

FIG. 34 is a view for showing an area arrangement of ROM58.

FIG. 35 is a view for showing one example of a character pattern.

FIG. 36 is a view for showing an area arrangement of RAM59.

FIG. 37 is a view for showing memory data of PLU memory area EA2 in FIG. 36.

FIG. 38 is a view for showing memory data in data register area EA3 and a total register area EA4.

FIG. 39a and FIG. 39b a view for showing one example of a label and a receipt, respectively.

DESCRIPTION OF THE PREFERRED EMBODIMENTS

Figure 1:
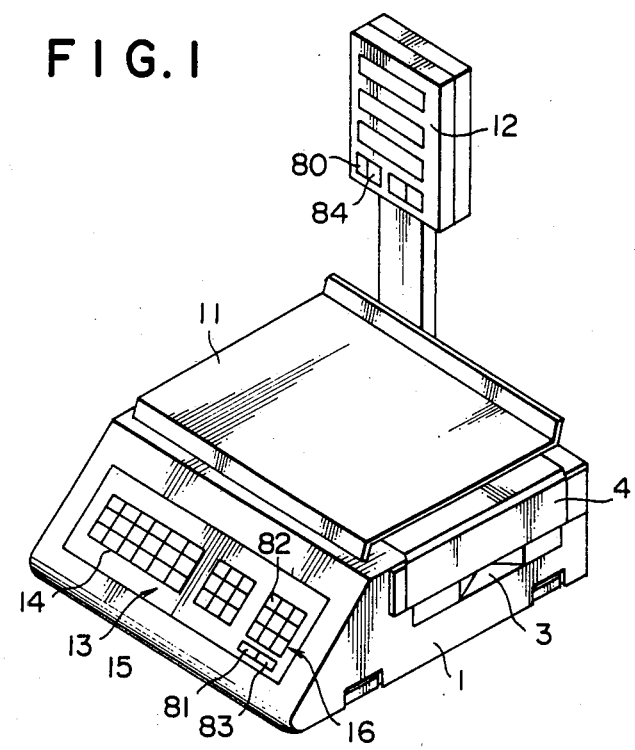
FIG. 1 is a perspective view for illustrating an outer appearance construction of an electronic scale assembled with the printer of the present invention.
Figure 23:
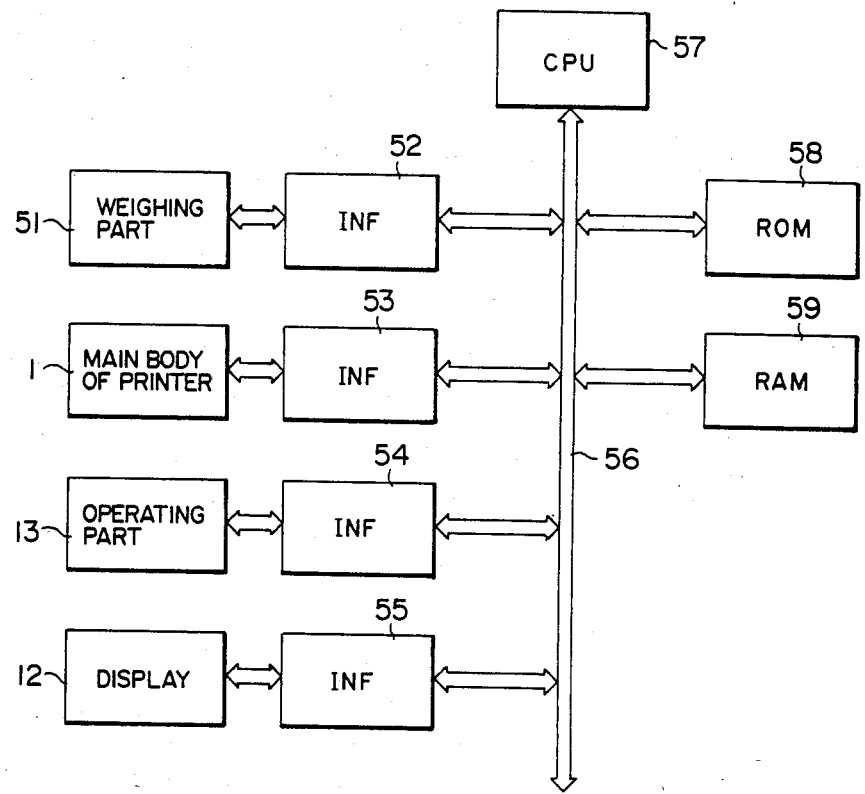
FIG. 23 is a block diagram for showing an electrical arrangement of the electronic scale.

FIG. 1 is an outer appearance view for showing an electronic scale in which a printer of the present invention is integrally assembled, wherein 1 designates the main body of the printer, 3 designates a cassette installing part and 11 designates a weighing pan to which a weighing sensor (not shown) such as a load cell is connected to form a weighing part 51 (see FIG. 23).

Printer 1 includes element 12 which designates a displaying part for displaying various data such as weight, unit, price and selling price etc. of the weighed item and element 13 which designates an operating part comprising preset keys 14, ten keys 15 and function keys 16. The preset keys 14 are keys for use in calling up preset data such as preset unit price for each of the items, the ten keys 15 are keys for use in inputting various numerical data and the function keys 16 are keys for use in correcting operation.

Figure 7A:
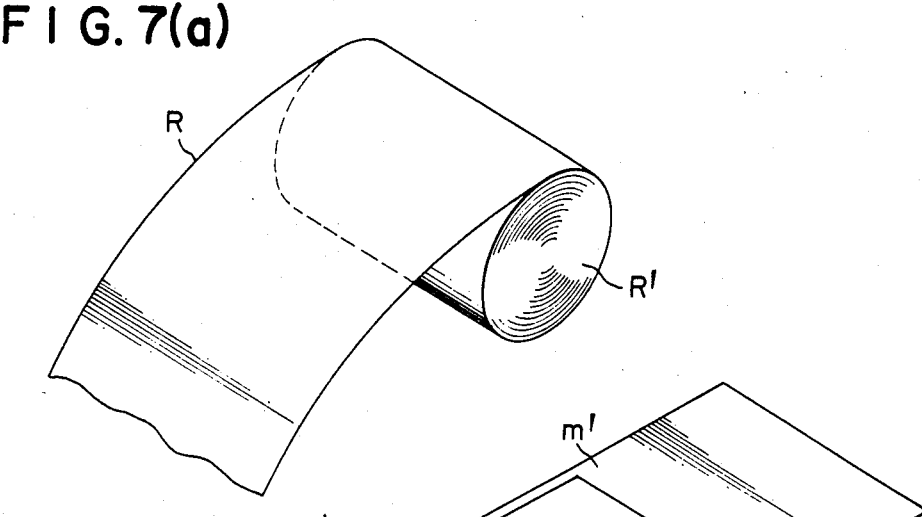
FIG. 7a is a perspective view for showing a receipt sheet.
Figure 7B:
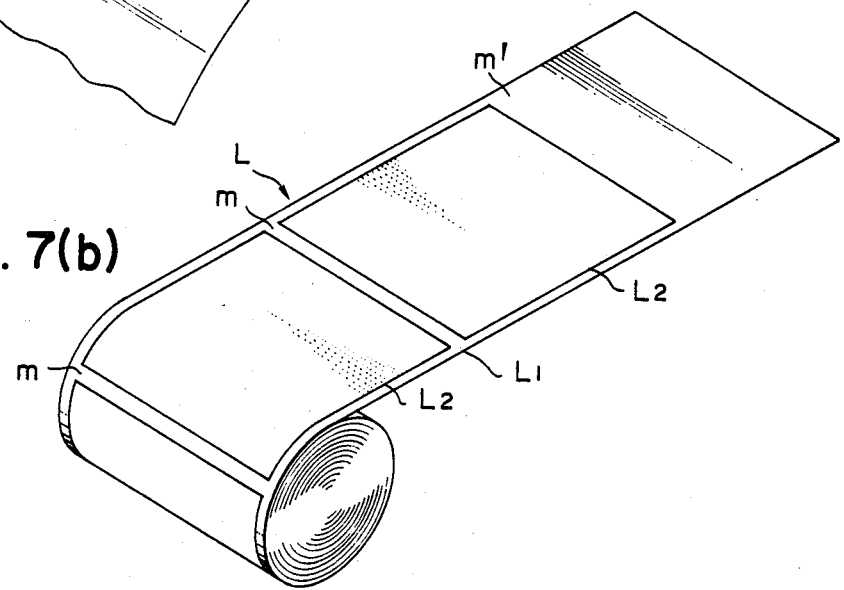
FIG. 7b is a perspective view for showing a label sheet.

Element 4 denotes a cassette for storing receipt sheets R or label sheets L shown in FIG. 7 and the cassette is removably attached to the cassette installing part 3 of the main body 1 of the printer. For conveniences of description, the receipt cassette for storing the receipt sheet R is designated as 4a, the label cassette for storing the label sheet L as 4b and they are totally called cassette 4 as shown in FIGS. 5(a), (b) and 6 (a), (b).

Figure 5A:
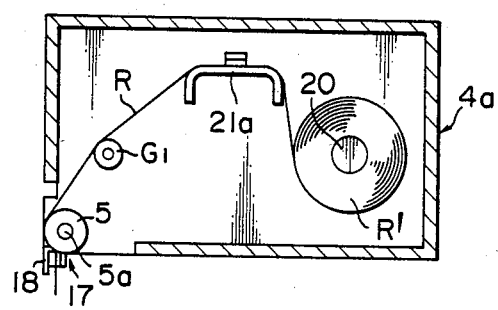
FIG. 5a is a sectional view for showing a receipt cassette.
Figure 5B:
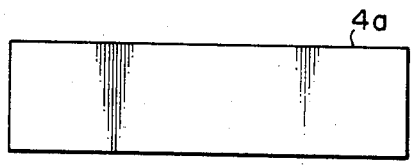

The receipt cassette 4a is formed with an opening of sheet issuing port 17 at one corner of a shallow box as shown in FIG. 5, and a platen roller 5 for use in printing and feeding the sheet is arranged at the inside of the issuing port 17 and also a cutter 18 for use in cutting the receipt sheet having printing operation completed is arranged near the issuing port 17.

Figure 4:
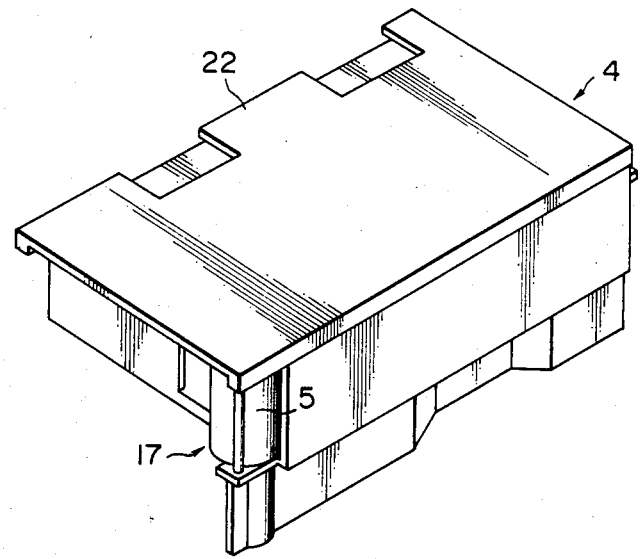
FIG. 4 is a perspective view for showing a cassette.

As shown in FIG. 5(a) the cassette 4a includes a set shaft 20 for supporting a roll R' having a receipt sheet R wound therein, and a sensing part 21a and a guide roller G1 arranged along a transporting direction of the receipt sheet arranged between the set shaft and the issuing port 17. As shown in FIG. 4, the plate on the upper surface of the cassette 4a is a cap plate 22 arranged to be opened or closed. Upon opening of this cap plate 22, the roll R' is set on the set shaft 20, the receipt sheet R is pulled out and then loaded so that the sheet may pass through the sensing part 21a, guide roller G1, platen roller 5 and the cutter 18 and finally through the issuing opening 17.

The sensing part 21a cooperates with a sensing element part S3 arranged at the installing part 3 of the main body 1 of the printer so as to construct the sensor 21 and to detect the presence or absence of the receipt sheet R, and their details will be described in detail later.

The shaft 5a of the platen roller 5 is projected downward of the cassette 4a and is provided with a gear (not shown) to be engaged with a power transmitting gear 25 of the installing part 3.

Figure 6A:
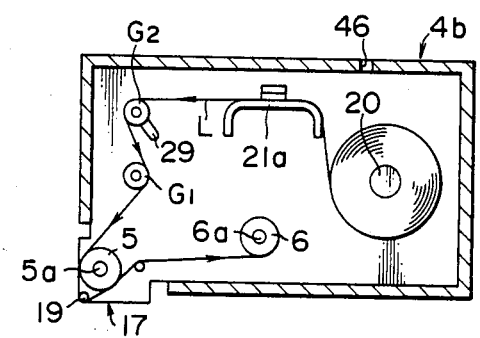
FIG. 6a is a sectional view for showing a label cassette.
Figure 6B:
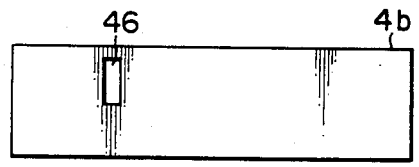

The label cassette 4b is applied for storing a label sheet L in a shallow box as shown in FIG. 6, and within the cassette 4b is arranged a label peeling-off dispensor 19 in place of the cutter 18 of the above-mentioned cassette 4a. Label cassette 4b includes a take-up reel 6 for winding up the base sheet L1 having the label peeled off and an adjusting guide roller G2 capable of being moved along an elongated hole 29 and fixed at any position.

Within the cassette 4b is also arranged a sensing part 21a having the same structure as that of the sensing part 21a for the cassette 4a, and the presence or absence of the label L2 and the position of the label are detected by this sensing part 21a and the sensing element part S3 (their details will be described later).

In the case where the label L2 having a different length is to be applied, the guide roller G2 is moved along the elongated hole 29, thereby the distance from the sensing part 21a to the platen roller 5 can be varied in response to the length of the label roll.

The shaft 5a of the platen roller 5 is projected out of the cassette 4b and is provided with a gear (not shown) to be engaged with the gear 28 for use in transmitting a power at from the installing part 3. Similarly, the shaft 6a of the take-up reel 6 is projected out of the cassette 4b and is provided with a rubber wheel (not shown) to be press contacted with a friction wheel 30 of the installing part 3.

Figure 2:
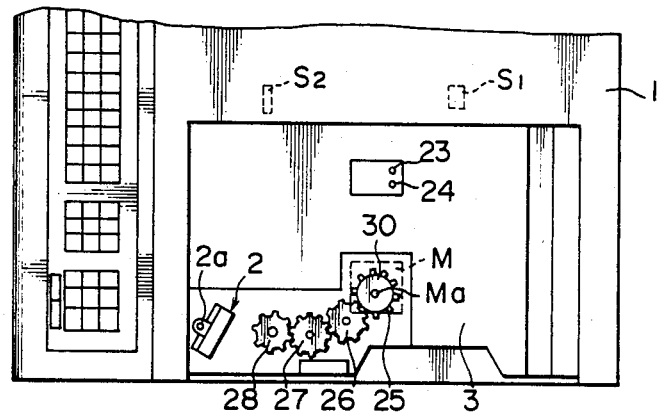
FIG. 2 is a top plan view of a main body of the printer with its substantial part being enlarged.
Figure 3:
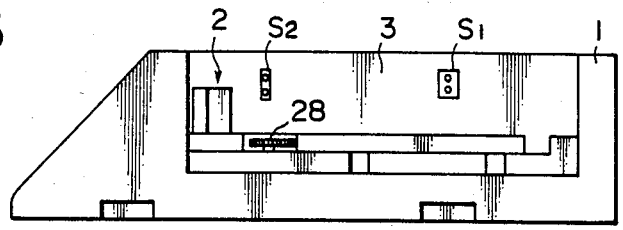
FIG. 3 is a side elevational view of FIG. 12.

FIGS. 2 and 3 illustrate an installing part 3 for installing the cassette 4. When the cassette 4 is installed at the installing part 3, the thermal head 2 is arranged at a position corresponding to the platen roller 5 and arranged such that it may be rotated around the fulcrum shaft 2a by a certain amount. The thermal head 2 is of a structure in which it may be pushed against the platen roller 5 with the desired printing pressure under an action of spring (not shown) etc.

Below the installing part 3 is arranged a stepping motor M and the motor shaft Ma is projected out of the upper surface of the installing part 3 and then is provided with a gear 25 and the friction wheel 30. The gear 25 is engaged with a gear of the platen roller 5 when the gears 26, 27 and 28 are engaged and the cassette 4b is installed and then the platen roller 5 may be rotated by the desired number of rotations. The friction wheel 30 is abutted against the rubber wheel of the cassette 4b to cause the take-up reel 6 to be rotated and to take-up the base sheet.

In the case of the receipt cassette 4a, the platen roller 5 is driven only with a gear 28.

The installing part 3 of the main body 1 of the printer is provided with a sensing element part S3 which is positioned opposite from the sensing part 21a of the cassette when the the cassette 4 is installed.

The sensing element part S3 is composed of a light emitting element 23 and a light receiving element 24, the light emitting element 23 and the light receiving element 24 being composed of a semiconductor element, respectively, and the former being composed of a light emitting diode and the latter being formed of a phototransistor. They are arranged in parallel and buried in the bottom wall and connected to a control unit (not shown) for controlling the driving of the stepping motor M.

The sensing part 21a of the cassette 4 which constitutes the sensor 21 along with the sensing element part S3 will be described in detail in reference to FIGS. 8 to 10.

Figure 8:
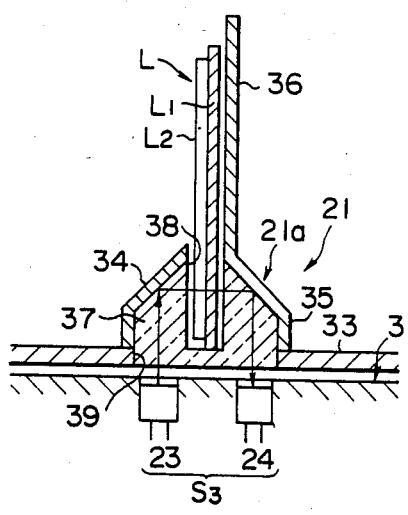
FIG. 8 is a sectional view for showing a fixing structure for a sensor 21.
Figure 9:
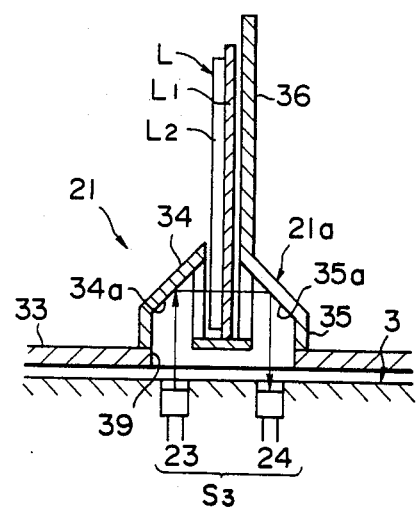
FIG. 9 is a sectional view for showing a modified form of the sensing part 21a of the sensor.

The sensing part 21a is provided with a pair of raised walls 34 and 35 as shown in FIGS. 8 and 9, which are raised from the bottom wall 33 of the cassette 4. The raised walls 34 and 35 are bent at an angle 45°. in a direction crossing each other, and the label sheet L or the receipt sheet R (for the sake of convenience of description, the label sheet will be described) will pass through between these raised walls 34 and 35. To the upper end of the of the raised walls 34 and 35, for example, the raised wall 35 is connected a vertical raised guide wall 36 integrally, and the label base sheet L1 is guided by this guide wall 36.

Within the sensing part 21a is arranged a reflecting means for reflecting a light from the light emitting element 23 across the passing path of the label sheet L at one side thereof and in a direction incident to the light receiving element 24. The reflecting means is composed of a prism having a shape to be fitted in the sensing part 21a. The prism 37 is provided with a groove 38 for passing the label sheet L at its intermediate part, its lower end is fitted to the opening hole 39 of the bottom wall 33 of the cassette and is flush with the outer surface of the bottom wall 33.

The sensing part 21a is operated such that when the cassette 4 is installed in the main body 1 of the printer during its use, one label L2 subsequent to the proceeding label L2 positioned at the printing part (between the platen roller 5 and the thermal head 2) is positioned in the sensing part 21a. A light from the light emitting element 23 is reflected against a reflection means in the sensing part 21a, i.e. a prism 37 and incident on the light receiving element 24. After crossing the passing path of the label L2, the intensity of light incident on the light receiving element 24 varies in response to the presence or absence of the label L2, thereby either the front end or rear end of the label L2 is detected and the sensing of the label position is performed. The sensing sensitivity can be improved by a method wherein the opposed surface of the prism 37 facing both sides of the groove 38 acting as the passing path of the label L2 is made narrow. That is, a narrow width of the opposed surfaces may cause a converged part therein to enable the intensity of light to be increased.

The above-mentioned light reflecting means is not limited to the prism 37 above, but, for example, as shown in FIG. 9, it may be constructed such that the inner surfaces of the bent parts 34a and 35a of the raised walls 34 and 35 in the sensing part 21a are of a mirror surface.

In turn, if a displacement of the printing position of the label L2 is detected by sensing the position of the label, the printing position of the label L2 is modified. In order to modify the printing position, the number of steps of the stepping motor M for driving the platen roller 5 is varied or the length of the passing path of the label 1 is elongated or shortened by displacing the guide roller G2 as described above, and so in the present preferred embodiment, the latter means is employed as described above. Detailed illustration of the guide roller G2 is given with respect to FIG. 10, wherein the guide roller G2 has its flucrum shaft 45 slidably fitted in the elongated hole 29 in the cassette bottom wall 33 and engaged in the bottom wall 33 through screw 40 and washer 41.

Figure 10:
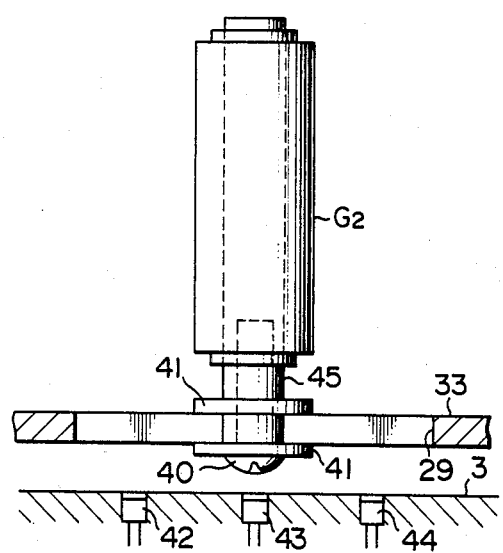
FIG. 10 is a sectional view for showing an adjusting means for a guide roller $G_2$.
Figure 11:
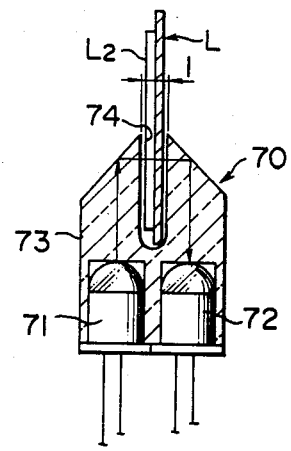
FIG. 11 is a sectional view for showing the conventional type of structure of the sensor.

In FIG. 10, the unit is constructed such that the kind of label L2 being used at present can be recognized by detecting the position of the guide roller G2.

That is, the bottom wall 33 of the installing part 3 df the main body 1 of the printer below the elongated hole 29 is provided with the number of sensing elements corresponding to the kind of label L2, for example, if the length of the label has three kinds, three sensing elements 42, 43 and 44 are arranged. These sensing elements 42, 43 and 44 are applied to detect the screw 40 for the guide roller G2, the sensing element being of a reflection type sensor, a microswitch and a magnetic switch such as hole element etc., and the elements are connected to a display means (not shown) and the result of sensing operation is displayed in the display means.

In the case where a magnetic switch is applied as the elements 42, 43 and 44, the screw 40 for the guide roller G2 is made as a magnet.

In the above description concerning the sensor 21, the sensing of label position has been described, wherein the label sheet L or the receipt sheet R is sensed for its presence or absence and the completion of these sheets is sensed.

As found in the above-mentioned preferred embodiment, the sensor 21 is divided into the sensing part 21a and the sensing element part S3, the sensing part 21a is arranged in the cassette 4, the sensing element part S3 is arranged at the installing part 3 of the main body 1 of the printer, and when the label sheet L or the receipt sheet R is installed at the cassette 4, the sheet L or R is passed through the sensing part 21a, so that mere installation of the cassette 4 enables the sheet L or R to be set in the sensor 21. Therefore, the unit may provide effective attachment or removal of the cassette 4 as well as its replacement and also no projecting member of the cassette 4 may provide such an effect as the installing direction of the cassette is not restricted.

Sensing means for sensing if the printing sheet loaded in the cassette 4 is a label sheet or receipt sheet will be described.

This sensing means is operated such that the sensor S1 is arranged in advance at the installing part 3 of the main body 1 of the printer, the kind of the cassette 4 is detected by the sensor and thereby the sheet is judged if it is the label sheet L or the receipt sheet R. For this reason, the cassette 4a and the cassette 4b are provided with different marks, e.g. openings therein. In the preferred embodiment, a hole 46 is made at the rear surface of the label cassette 4b and the receipt cassette 4a is not provided with any openings (see FIGS. 6 and 5).

The above-mentioned sensor S1 is of a reflection type sensor which is installed at the abutting portion 3' of the installing part 3 to detect the presence or absence of the hole 46 when the cassette 4 is installed and judges if the cassette is the label cassette 4b or the receipt cassette 4a by the presence or absence of the hole.

If the cassette 4b is detected, the printing sheet is a label sheet L and in turn if the cassette 4a is detected, the loading of the receipt sheet R in the main body 1 of the printer is electrically detected.

The sensor S2 provided in the installing part 3 senses if the cassette 4 is positively installed in the installing part 3 or not (FIGS. 2 and 3).

Thus, when the cassette 4 is inserted at the side opening of the installing part 3 and up to the abutting position of the installing part 3, it may be fixed by a leaf spring (not shown). The thermal head 2 is abutted against the platen roller 5 and pressed with a desired pressure and at the same time it may be engaged with the driving gear 28 of the platen roller 5 and the driving rubber wheel of the take-up reel 6 is abutted against the friction wheel 30. The sensor S2 detects if the cassette 4 is positively installed or not and the sensor S1 recognizes the kind of printing sheet in the cassette 4.

In the preferred embodiment of the present invention, since the two kinds of printing sheets, i.e. a label sheet and a receipt sheet are applied, the kind of the sheet can be detected by the presence or absence of the hole 46, and if there are more than three kinds of printing sheets to be sensed, two holes 46 are made and a combination of the presence or absence of each of the holes may detect the kind of sheet.

That is, the kind of the printing sheet is defined for each of the combinations of hole:hole, hole:non-hole, non-hole:hole, non-hole:non-hole etc.

In case of the sensing means applied with an opening 46 made in the cassette 4, a compatibility of the cassette is not assured.

Figure 12:
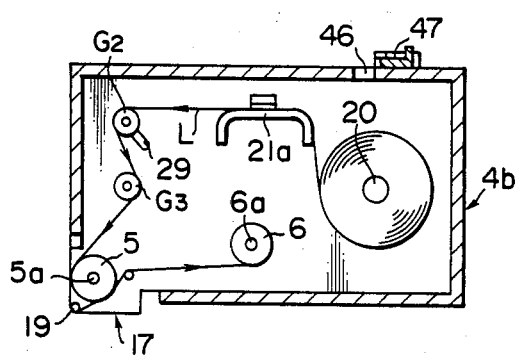
FIG. 12 is a sectional view for showing a modified form of means for sensing the kind of cassette.
Figure 13:
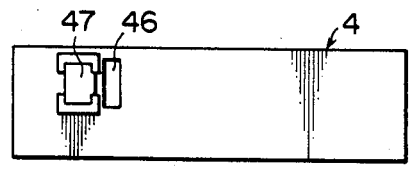
FIG. 13 is a rear view of FIG. 12.

Thus, as shown in FIGS. 12 and 13, a sliding plate 47 is arranged at the hole 46 of the cassette 4 to open and close the hole 46, resulting in that a compatibility of the cassette can be improved and no trouble is found in storing of the receipt sheet R in the label cassette 4b and in storing of the label sheet L in the receipt cassette 4b.

Some modified forms of means for detecting the kind of sheet are as follows:

(1) Sensing is performed by the presence or absence of the projection by arranging it in place of the hole 46;

(2) Arranging a reflection plate in place of the hole 46, arranging the light emitting and light receiving sensors at the installing part and the detecting operation is performed by the presence or absence of the reflection plate;

(3) A bar code label having storing content printed on it is adhered on the surface of the cassette and at the same time a scanner is arranged at the installing part to detect the bar code; the sensing not by the cassette but by the direct sensing of the sheet may also be available;

(4) The light transmitting type sensors are arranged to hold the sheet therebetween which is pulled out of the roll in the cassette, the desired amount of sheet is fed when the cassette is installed, the sheet is sensed by a variation in output in the sensor if the sheet is for a label or a receipt and at the same time the kind of printing sheet is detected in reference to the rate of light transmittance.

Figure 14:
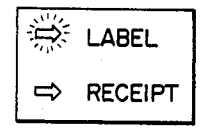
FIGS. 14 and 15 are a front elevational view for showing one example of means for displaying the kind of printing sheet.
Figure 15:
Figure 20:
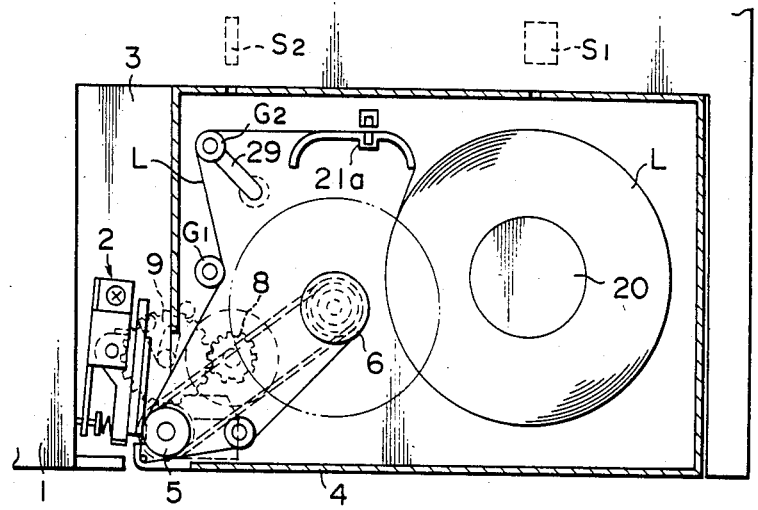
Figure 21:
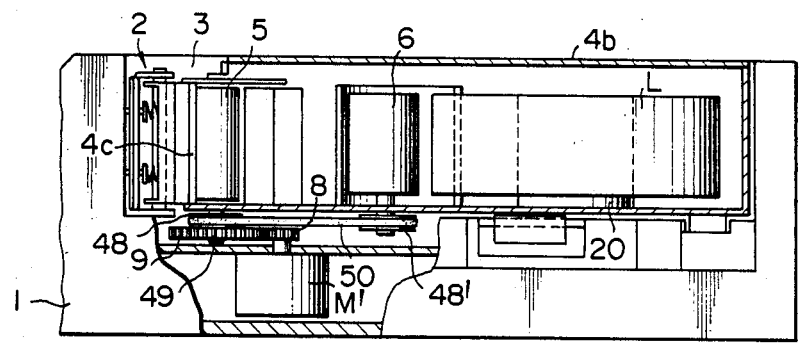

The kind of the printing sheet in the cassette 4 sensed in this way is displayed as shown in FIGS. 14 and 15 by indicating the kind by an arrow or illuminating it. The display is not limited to the display part 12, but it may be arranged at a place where it may easily be seen or it may be indicated by sound.

Some modified froms of driving means for the above-mentioned platen roller 5 and the take-up reel 6 are illustrated in FIGS. 16 to 22 and for the sake of convenience of description, the same component elements as that of the above-mentioned members are designated by the similar reference symbols and their description will be eliminated.

FIGS. 16 to 21 illustrate a system in which the platen roller 5 is driven and the take-up reel 6 is driven by power from the platen roller 5.

In the figures, the installing part 3 has a stepping motor M' below it, a shaft Ma' of the motor M' is projected out of the upper surface of the installing part 3, a gear 8 for use in transmitting power is mounted and at the same time a gear 9 is engaged with the gear 8. A shaft 9a of the gear 9 is slidably installed in an arcular groove 10 around the motor shaft Ma' and biased in one direction by a spring (not shown).

The cassette 4b is constructed such that the shaft 5a of the platen roller 5 is projected out of the cassette, a pulley 48 and a gear 49 are coaxially attached to the shaft 5a and at the same time the shaft 6a of the take-up reel 6 is similarly projected out of the cassette, a pulley 48' is fixed to the shaft 6a, a rubber belt 50 is wound around both pulleys 48 and 48' so as to transmit power from the shaft 5a to the shaft 6a.

The gear 49 is engaged with the gear 9 at the installing part 3 to accept the power from the stepping motor M'.

The cassette 4b is slid and installed at the side opening in the installing part 3. In case that the gear 49 of the cassette 4b is not engaged with the gear 9 of the installing part 3, the gear 9 is moved along the arcualar groove 10 while being rotated around the outer circumference of the gear 8, so that the installation of the cassette 4b causes the gear 9 to be engaged with the gear 49. Since the direction of escaping of the gear 9 is opposite to the rotational direction of the motor M', the rotation of the motor M' causes the gear 9 to be pressed against the gear 49, resulting in that a positive transmitting of power force can be assured.

The preferred embodiment of the present invention is constructed such that the platen roller 5 is driven, so that the printing can be performed by feeding the printing sheet even in case that the take-up reel is required and also in case that the take-up reel is not required.

If the cutter required for the receipt sheet and the dispenser required for the label sheet are arranged at the main body 1 of the printer or the cassette 4, the cassette may be of the same construction, the cost is not expensive and it is possible to provide a quite convenient product.

Figure 22:
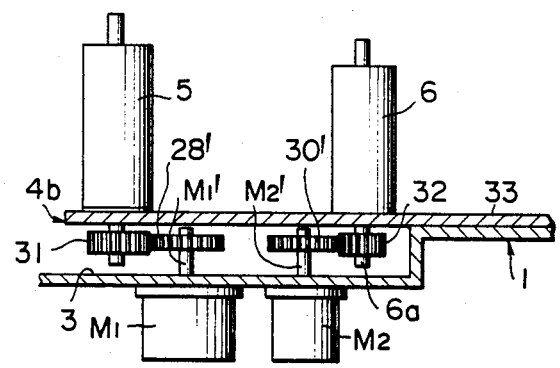
FIG. 22 is a sectional view for showing a modified form of a platen roller and means for driving a take-up reel.

FIG. 22 illustrates a structure in which a driving source is connected to each of the platen roller 5 and the take-up reel 6. The stepping motor M1 and the DC motor M2 are mounted in the main body 1 of the printer, and the gears 28' and 30' are rotatably driven by and attached to the shafts M1' and M2' of the motors M1 and M2.

In the figure, a gear 31 engaging with the gear 28' is mounted on the shaft 5a of the platen roller 5 of the cassette 4b, and a gear 32 engaging with the gear 30' is mounted on the shaft 6a of the take-up reel 6.

Then, an electrical arrangement of an electronic scale having the main body 1 of the present invention will be described in reference to FIGS. 23 to 26.

In FIG. 23, each of the weighing part 51, the main body 1 of the printer, operating part 13 and the display part 12 having the above-mentioned constitution is connected to a bus 56 an CPU 57 through interface circuits 52, 53, 54 and 55. Element 58 in the figure denotes ROM (read-only-memory) for storing programs and element 59 designates RAM (random-access-memory) to be applied in various calculations.

Figure 24:
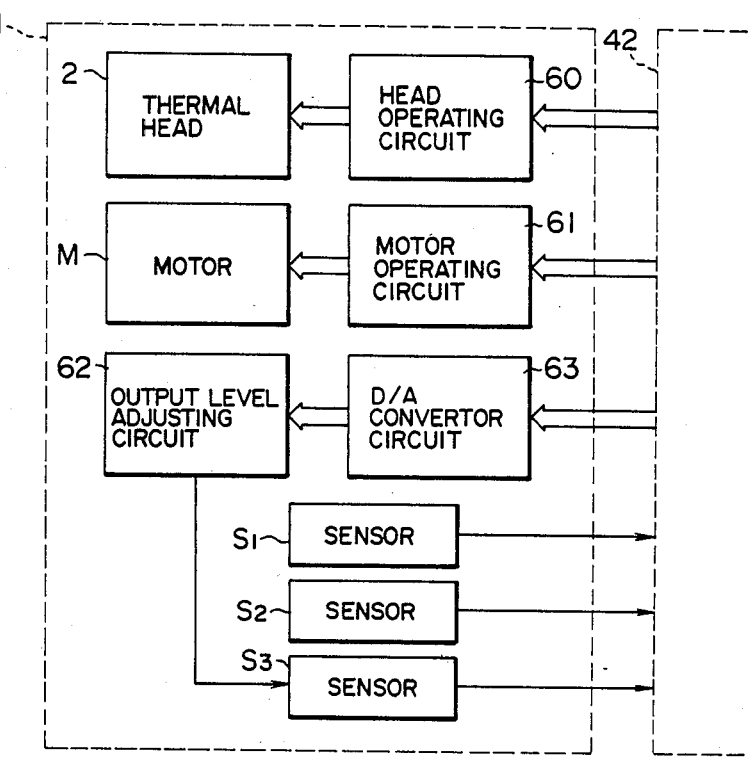
FIG. 24 is a block diagram for showing an electrical arrangement of the main body of the printer.
Figure 25:
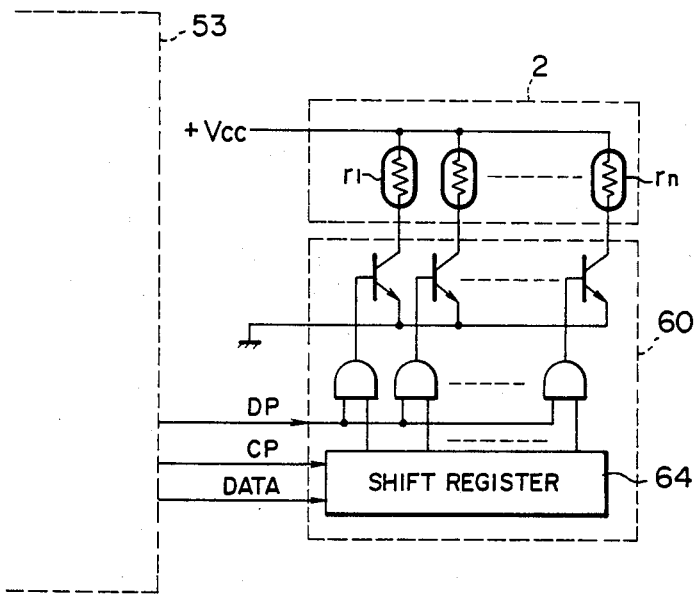
FIG. 25 is a circuit diagram for showing in detail a thermal head of the main body of the printer and the driving circuit therefor.

The main body 1 of the printer is, as shown in FIG. 24, composed of the following component elements:

(1) the thermal head 2 and the head driving circuit 60 for driving the thermal head:

(2) stepping motor M and a motor driving circuit 61 for controlling its driving:

(3) sensors S1 and S2 for discriminating the receipt cassette 4a and the label cassette 40:

(4) sensor S3 for checking the receipt sheet R or the label sheet L and sensing their presence or absence and label position, and an output level adjusting circuit 62 and D/A (analogue digital) covertor circuit 63:

The thermal head 2 and its driving circuit 60 described in the above item (1) of the component elements are illustrated in detail in FIG. 25, wherein the thermal head 2 is composed of the heating resistors r1 to rn of 128 dots, the shift register 64 is comprised of a dot pattern corresponding to one line, the printer interface circuit 53 generates in reference to the control data fed from the CPU 57 a printing instruction signal DP to the driving circuit 60, a clock pulse CP for shifting the printing data to the shift register 64 and the printing data (serial dot data), respectively.

Figure 26:
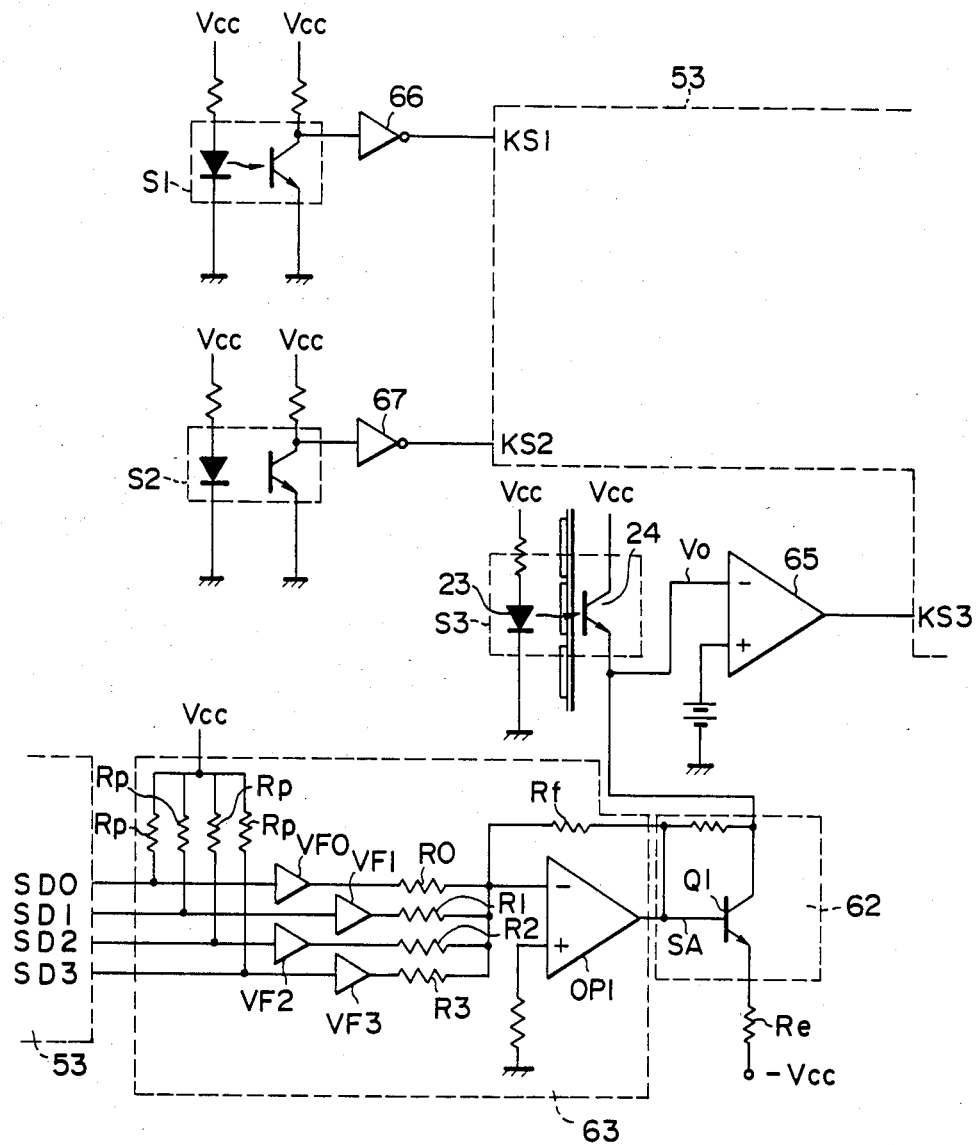
FIG. 26 is a circuit diagram for showing the sensors S1 to S3 and their peripheral circuit arrangements.

The fundamental circuits for the sensor S3, output level adjusting circuit 62 and D/A convertor circuit 63 of the above-mentioned component element (4) are illustrated in FIG. 26. (In this figure, the sensors S1 and S2 are also shown in addition to these elements);

In FIG. 26, D/A convertor circuit 63 is applied for converting SD0 to SD3 of four-bit signals fed from the printer interface circuit 53 to the analogue signal SA, and is composed of an adder circuit mainly having a calculation amplifier (hereinafter called as OP amp) OP1. To the resistors R0 to R3 for adder are applied the signals SD0 to SD3 through the voltage followers VF0 to VF3. The values of resistors R0 to R3 are, for example, weighted by 8K, 4K, 2K and 1KΩ, correspond to sixteen SD values defined by four bit signals SD0 to SD3 and thus the analogue signal SA of sixteen levels can be outputted. In the figure, the resistor Rf is a resistor for use in feeding-back operation, the resister Rc is a resistor for accommodation and the resistor Rp is a resistor for pull-up operation.

Figure 27:
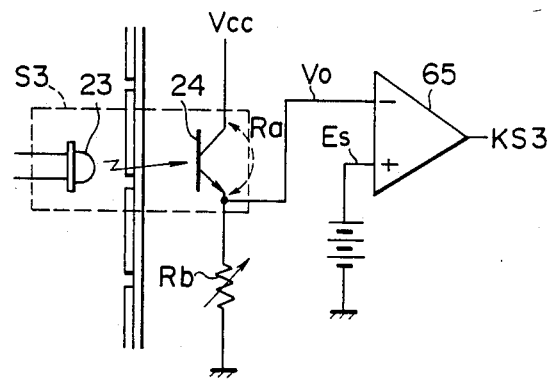
FIG. 27 is a view for illustrating the operation of the output level adjusting circuit 62.

Then, the output level adjusting circuit 62 is composed of the transistor Q1 and an equivalent resistance between the collector and emitter of the transistor Q1 is varied. The collector of the transistor Q1 is connected to the emitter of the light receiving element (phototransistor) of the sensor S3, and this connecting point is connected to the inverted input terminal of the comparator 65. As a result, the voltage at the inverted input terminal of the comparator 65, i.e. the output voltage Vo of the sensor S3 is, as shown in FIG. 27, determined by a ratio between an equivalent resistor Ra of the light receiving element 24 and the equivalent resistance Rb between the collector of the transistor Q1 and the ground (this value is a sum of an equivalent resistance value between the collector and the emitter of the transistor Q1 and the resistance value of the resistor Re between the emitter and the ground). That is, if the resistance Rb is constant, light receiving amount of the light receiving element 24 is increased, as the resistance Ra is decreased, the output voltage Vo is increased, and if the light receiving amount of the light receiving element 24 is constant (at this time, the resistance value Ra is constant), the more the resistance Rb, the more the output voltage Vo.

In the present invention, when the label sheet L is used, the light receiving amount is decreased, so that the resistance value Rb is increased to raise up the level of the output voltage Vo, and in turn when the receipt sheet R is used, the amount of light received is increased and so the resistance value Rb is decreased and the level of the output voltage Vo is decreased. For example, in case of applying the label sheet L, all the signals SD0 to SD3 are applied as "1" signal, and the output signal SA of the D/A convertor circuit 63 is decreased (since the OP amp OP1 forms an inverted adder, the more the values of SD0 to SD3, the less the output SA), thereby the resistance value Ro is increased. When the receipt sheet R is used, all the signals SD0 to SD3 are set to "0" signal to increase the signal SA and then the resistance value Ra is decreased. In this way, the level of the output voltage Vo is adjusted approximately constant (see FIG. 28(c)) and approaches to the upper and lower values of the reference voltage Es fed to the non-inverted input terminal of the comparator 65. Then, the comparator 65 produces the signal KS3 which becomes "High" level ("1" signal) when a relation of Vo<Es is found and in turn becomes "Low" level ("0" signal) when a relation of Vo>Es is found (see FIG. 28(d)).

The outputs from the sensors S1 and S2 are inverted by the invertors 56 and 57 to become the signals KS1 and KS2. As a result, the signals KS1 and KS2 become "1" signal ("High" level) when the light receiving elements of the sensors S1 and S2 accept the light, and in turn become "0" signal when they do not accept the light.

Then, the operation of the preferred embodiment of the present invention will be described.

At first, when the cassette 4 is installed in the installing part 3, the cassette is judged if it is a receipt cassette 4a or a label cassette 4b. That is, if it is a receipt cassette 4a, the light receiving elements of the sensors S1 and S2 receive the light, the signals KS1 and KS2 become a "1" signal and if it is a label cassette 4b, only the sensor S1 receives the light, the signal KS1 becomes a "1" and the signal KS2 becomes a "0" signal. When these signals KS1 and KS2 are supplied to CPU57 through the printer interface circuit 53 and the bus 56, CPU57 discriminates the cassette 4, and sets all the signals SD0 to SD3 to "0" signal when it is a receipt cassette 4a, and sets all the signals SD0 to SD3 to "1" signal when it is a label cassette 4b. With this arrangement, as described above, when the cassette is a receipt sheet R cassette, the output level of the sensor S3 is decreased and if it is a label sheet L cassette, the above-mentioned output level is increased and it is adjusted such that both levels are substantially equal. That is, in case of no output level adjusting circuit 62, the output of the sensor S3 kept at the level shown in FIG. 28b is transferred to the level shown in FIG. 28c by the output level adjusting circuit 62 in correspondence with the label sheet 1 and the receipt sheet R shown in FIG. 28a, the "High" level of the output voltage Vo of the sensor S3 becomes sufficiently higher than the reference voltage Es and the "Low" level becomes sufficiently lower than the reference voltage Es. As a result, the signal KS3 becomes a "1" signal when the label L2 is detected in case of the label sheet L and becomes a "0" signal when the base sheet L1 (i.e. slit m and terminal end m') is detected, and in turn in case of the receipt sheet R, it becomes "1"/"0" signal in response to the presence/absence of the receipt sheet R. In this way, it is possible to detect the presence or absence of and the position of the label L2 and the presence or absence of the receipt sheet R by the sensor S3.

Returning now to FIG. 26, the resistance value Rb is increased as the level of the analogue signal SA is decreased, and the level of the signal SA is decreased as the value SDs of the signals SD0 to SD3 are increased, so that these relations are as follows:

$$SD \downarrow \rightarrow SA \downarrow \rightarrow Rb \uparrow \rightarrow Vo \uparrow$$

in turn, $$SD \downarrow \rightarrow SA \uparrow \rightarrow Rb \downarrow \rightarrow Vo \downarrow$$

Figure 32A:
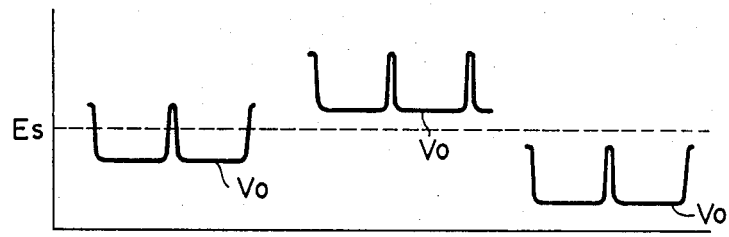
FIG. 32a is a view for showing a condition of level of the output voltage Vo before an automatic level adjusting operation is performed.
Figure 32B:
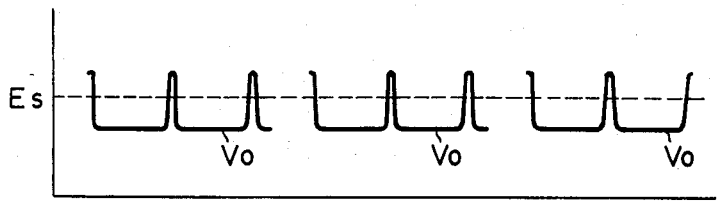
FIG. 32b is a view for showing a condition of a level of the output voltage Vo after the automatic level adjusting operation is performed.

When the thick label sheet L is used under a condition that the installation of the label cassette 4b is confirmed by the sensors S1 and S2, the value SD is increased to raise the output voltage Vo and in turn when the thin label sheet L is used, the value SD is decreased and the output voltage Vo is decreased and these voltages Vo are oscillated between the values over and below the reference voltage Es (see FIG. 32b). If the output voltage Vo is adjusted as above, the output signal KS3 of the comparator 65 becomes "High" level ("1" signal) when a relation of Vo<Es is found and in turn it becomes "Low" level ("0" signal) when a relation of Vo>Es is found.

Therefore, when the cassette 4b is installed at the installing part 3, the CPU57 judges that this cassette is a label cassette at first in reference to the signals KS1 and KS2, and then automatically adjusts the value SD of the signals SD0 to SD3 in response to the thickness of the label sheet L so that the output voltage Vo of the sensor S3 is oscillated between the values of over and below the reference voltage Es when the base sheet L1/label L2 are detected.

Figure 30:
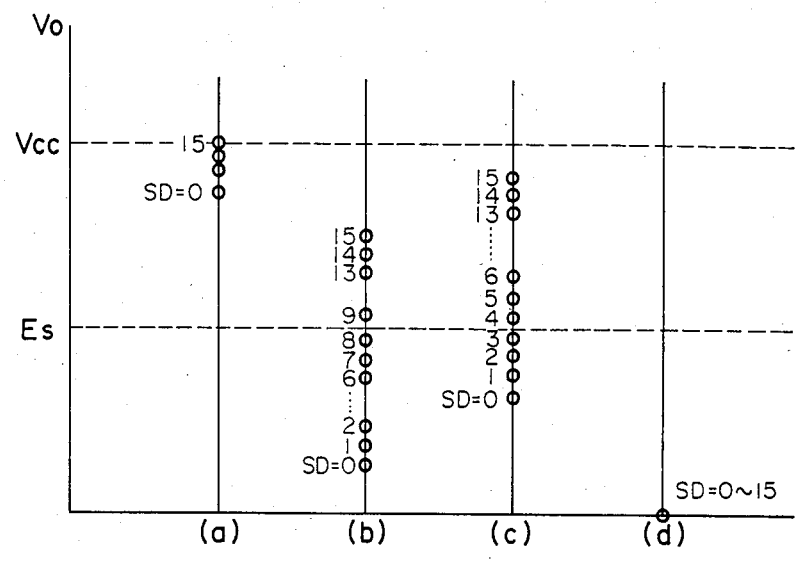
FIG. 30 is a view for showing an example of variation in level of the output voltage Vo of the sensor S3 when the value SD is modified.

FIG. 30 is a view for showing how the level of the output voltage Vo is varied and illustrates each of the cases, i.e. (i) the sensor S3 has no sheet at its sensing point, (ii) the label L2 is found, (iii) the base sheet L1, i.e. either the slit m or the terminal end m' is found, (iv) item completely shield the light, respectively.

As apparent from this figure, if the value SD is set to a proper value, a relation between the output voltage Vo and the reference voltage Es can be defined as Vo<Es when the label L2 is found, and in turn as Vo>Es when the base sheet L1 is found. For example, in case of this arrangement shown in this figure, if the value SD equals to 6, the relation can be assured. The CPU57 may perform the following process in order to set the value SD as above.

Figure 31:
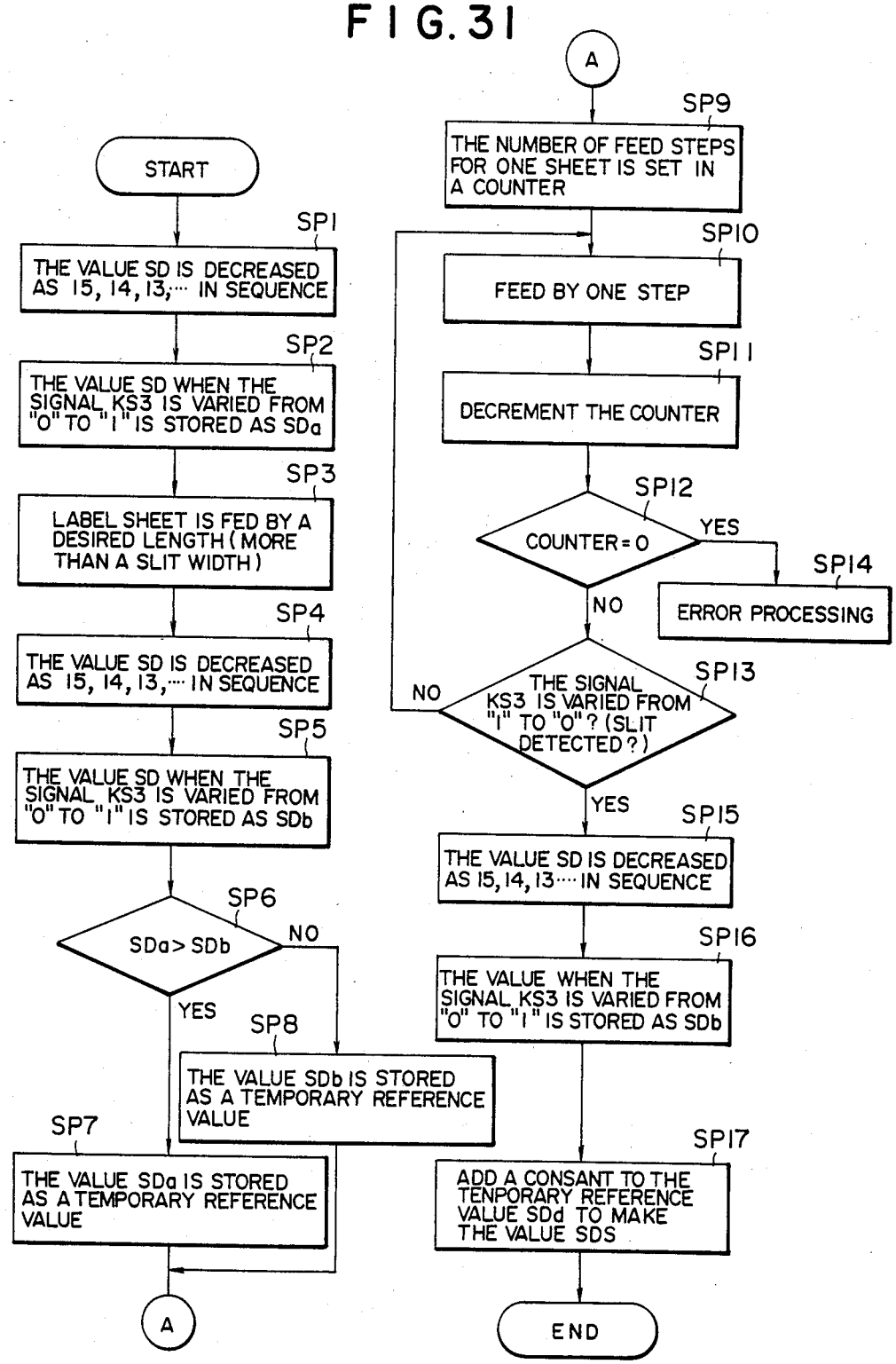
FIG. 31 is a flow chart for illustrating an operation for adjusting the output level of the sensor S3 automatically in reference to a difference in thickness of label sheet.

(1) The value SD is decreased in sequence from 15, 14, 13 ... and the value when the signal KS3 is changed from "0" to "1" signal, i.e. the initial value SD showing a relation of Vo<Es is stored as the value SDa (flow chart in FIG. 31, the steps SP1 to SP2). In this case, the sensing point of the sensor S3 has a label L2 or base sheet L1, so that SD=8 (in case of label L2) or SD=3 (in case of base sheet L1) in FIG. 30 is stored as SDa under the above-mentioned process.

(2) Then, the label sheet L is fed by the desired length (more than the width of the slit m), the label L2 comes to the sensing point when the slit m is placed at the sensing point, the same process as that of the step (1) is performed and the initial value SD having a relation of Vo<Es is stored as SDb (steps SP3 to SP5). Also, in this case, for example, the above-mentioned value SD=8 or SD=3 is set as the value SDb in response to a condition whether the label L2 is positioned at the sensing point or the base sheet L1 is positioned at the sensing point.

(3) The value SDa and the value SDb are compared and the higher value is set as a temporary reference value SDc (steps SP6 to SP8). Thereby, the value in case of label L2 becomes a temporary reference value SDc. For example, SDc equals to 8 in case of that shown in FIG. 30. In case that the terminal end m' of the label sheet L is initially positioned at the sensing point, the value found in case of the label L1 becomes a temporary reference value SDc, and in this case an error is detected in the step SP12 described later.

(4) Then, CPU57 rotates the platen roller 5 in step-by-step and feeds the label sheet L to find the slit m. That is, the number of steps for one label L2 is initially set in a counter in the CPU57 (step SP9), the label sheet L is fed by one step while the value in this counter is decremented (steps SP10 to SP11) to search the point where the signal KS3 is changed from "1" signal to "0" signal and to detect the slit m (step SP13). In this case, if the signal KS3 is not varied even if the value in the counter becomes 0, it is judged that the terminal end m' is sensed, the process is transferred from the step SP12 to the step SP14 to perform an error processing such as producing alarm output.

(5) Thus if the presence of the slit m is confirmed, the value SD is decreased again in sequence from 15, 14, 13, ... and the value SD when the signal KS3 is changed from "0" to "1" is stored as a new temporary value SDd (steps SP15 to SP16). This process is performed in order that the level adjustment is performed again at the slit m having no printed matter due to the fact that the printed names such as store name or frame are printed in advance at the label L12 and the temporary reference value SDc set at the label L2 is not stable. In this way, if the value SD is set as SDd (in the above example, SDd equals to 3) which is found when the signal KS3 at the slit m is varied from "0" to "1", i.e. the output voltage Vo is varied from a relation of Vo>Es to a relation of Vo<Es, a constant n (for example, 3) is added to the value SDd and this value becomes a reference value SDs. In the above example, a relation of SDs=3+3=6 is attained.

In this way, the level of the output voltage Vo of the sensor S3 is automatically adjusted in response to the thickness of the label sheet L and the level of Vo is adjusted in such a way as it may show substantially a constant value. That is, the case where the output level adjusting circuit 62 is not present, as shown in FIG. 32a, the level of output voltage Vo which is varied in response to the thickness of the label sheet L is changed to the level shown in FIG. 32b after adjustment of level, "High" level of the output voltage Vo becomes sufficiently higher than the reference voltage Es and "Low" level becomes sufficiently lower than the value Es. As a result, the signal KS3 is positively changed over to "1"/"0" in response to the presence or absence of the label L2 and a positive sensing can always be performed.

Thus, when the value SD is set at the proper value SDs, similar operation is performed in the same manner as that of the conventional system, the printing and issuing of the label 4 are performed.

In the above description, the level adjustment is performed when the cassette is installed, and the level adjustment may also be performed after the key operation at the operating part, for example, the feed key in the function key is performed. With this arrangement, it is possible to prevent the label from being uselessly applied under a level adjustment for every installation of cassette.

Then, ROM 58 and RAM 59 in a block diagram of FIG. 23 will be described in detail.

ROM 58 has areas E1 to E4 as shown in FIG. 34, each of the areas E1 to E3 has a label printing program, a receipt printing program and a control program stored therein, and the area E4 has various characters (numbers, symbols etc. are contained) and patterns (dot-patterns) stored therein. FIGS. 35 (a) to (c) illustrate one example of character pattern, and the area E4 has Japanese kana characters (46 characters) of 16×8 dots configuration shown in FIG. 35(a), numbers (ten characters) of 16×8 dots configuration, Japanese kana characters (46 characters) of 16×8 dots configuration, Chinese characters (100 characters) of 16×16 dots configuration shown in FIG. 35(b), Japanese kana characters (46 characters) of 7×5 dots configuration shown in FIG. 35(c) and numbers (ten characters) of 7×5 dots configuration and various character patterns. In this case, the character patterns of 16×8 dots and 16×16 dots are mainly applied for a label printing operation and the character pattern of 7×5 dots configuration is mainly for a receipt printing operation. Each of the character patterns is assigned with each of the character codes, and each of the character patterns is read out in reference to the character code. RAM 59 is provided with a buffer area EA1 PLU (Price Look Up) memory area EA2, data register area EA3 and a total register area EA4 as shown in FIG. 36, respectively, and at the same time a working area EA5 is arranged in it. In this case, the printing buffer area EA1 is an area where character pattern to be printed on the label or receipt is written and this area has a capacity corresponding to the printing section of the maximum label. PLU memory area EA2 is an area where item number, unit price and appreciation period of each of the products and item name for label printing and item name for receipt printing are set, respectively and area for storing 100 items is kept. In this case, the item name to be printed is stored by a character code for each of the characters in the item name column for a label printing and the item name column for a receipt printing, respectively. For example, if the item name for the label printing for the item number "0152" is "roast beef steak" and the item name for the receipt printing is "roast beef", the character codes of Chinese character "ushi (beef)" of 16×16 dots, Japanese kana " ロ ", "-" and " ス " of 16×8 dots are stored in sequence. In turn, in the item name column for the receipt printing are stored in sequence each of the character codes of the Japanese kana " ｷﾞ ", " ｰ ", " ﾌ " of 7×5 dots. The writing in the PLU memory area EA2 is performed by, for example, a host computer or a key operation at the operating part 13.

The data register area EA3 is an area in which data concerning the product purchased by a consumer and as shown in data of 50 items can be written. The total register area EA4 has, as shown in FIG. 38, an area EA4-1 and an area EA4-2 where the number of items and total price of the items purchased by a consumer are written.

The input operation for the above-mentioned RAM 59 will be described in reference to an example of a face-to-face selling.

The face-to-face selling used herein is a selling process in which sales personnel moves along with the consumer while the consumer moves in a selling spot, the sales personnel utilizes a near-by electronic scale everytime the consumer purchases the product and issues a label indicating a price, adhering the label on the package of the product (at this time, money is not exchanged) and lastly the product is checked at the checkout counter to receive the money.

(1) In case that the label cassette 4b is utilized:

In this case, the sales personnel sets the label cassette 4b at the installing part 3 of the main body 1 of the printer and then a correct installation of the cassette is confirmed by the display lamp 80 of the display part 12. The label cassette 4b sensed by the sensor S1 is written into the working area EA5 of RAM 59 through CPU57 for its cassette data. Then, the sales personnel mounts the product on the weighing pan 11 and inputs the item number of the product through the operating part 13. When the product is mounted on the weighing pan 11, the weight data WD corresponding to the weight of the product are outputted from the weighing part 51 (FIG. 23). When the item number is inputted, CPU57 reads out from the PLU data area EA2 of RAM 59 shown in FIG. 37 PLU data corresponding to the inputted item number (i.e. unit price, appreciation period, label printing item name and receipt printing item name), then transmits them to the working area EA5 and transfers the weight data WD to the working area EA5. Then, the CPU57 calculates the price of the product in reference to the weight data WD and the unit price data in the working area EA5 and stores the calculated price data in the working area EA5. Then, the CPU57 outputs the weight data WD, unit price data and price data in the working area EA5 to the display part 12. Thereby, each of the above-mentioned data is displayed in the display part 12 (FIG. 1).

In case a single item label (one item label) is to be issued, the sales personnel depresses the print key 81 at the operating part 13. In turn, in case that a total label (label having a total price of several items printed thereon) is to be issued, the sales personnel depresses the plus key 82 at the operating part 13. When this plus key 82 is depressed, each of the PLU data, weight data WD and price data in the working area EA5 is transferred to the data register area EA3 (FIG. 38) of RAM 59, the data in the area EA4-1 (initially reset) of total register area (FIG. 38) are incremented and the price data transferred from the working area EA5. Then, the sales personnel removes the product from the weighing pan 11, puts the next product on the weighing pan 11 and then inputs the item number. Thereby, in the same manner as described above, weight data etc. are displayed at the display part 12. When sales personnel depresses the plus key 82, each of the data concerning the second product is stored, the data in the area EA4-1 of the total register area EA4 (in this case "1") are incremented and the price data are added to the data in the area EA4-2. Similar processing will be repeated in sequence. The sales personnel performs operation of the plus key 82 for the last item and then depresses the print key 81.

Figure 40:
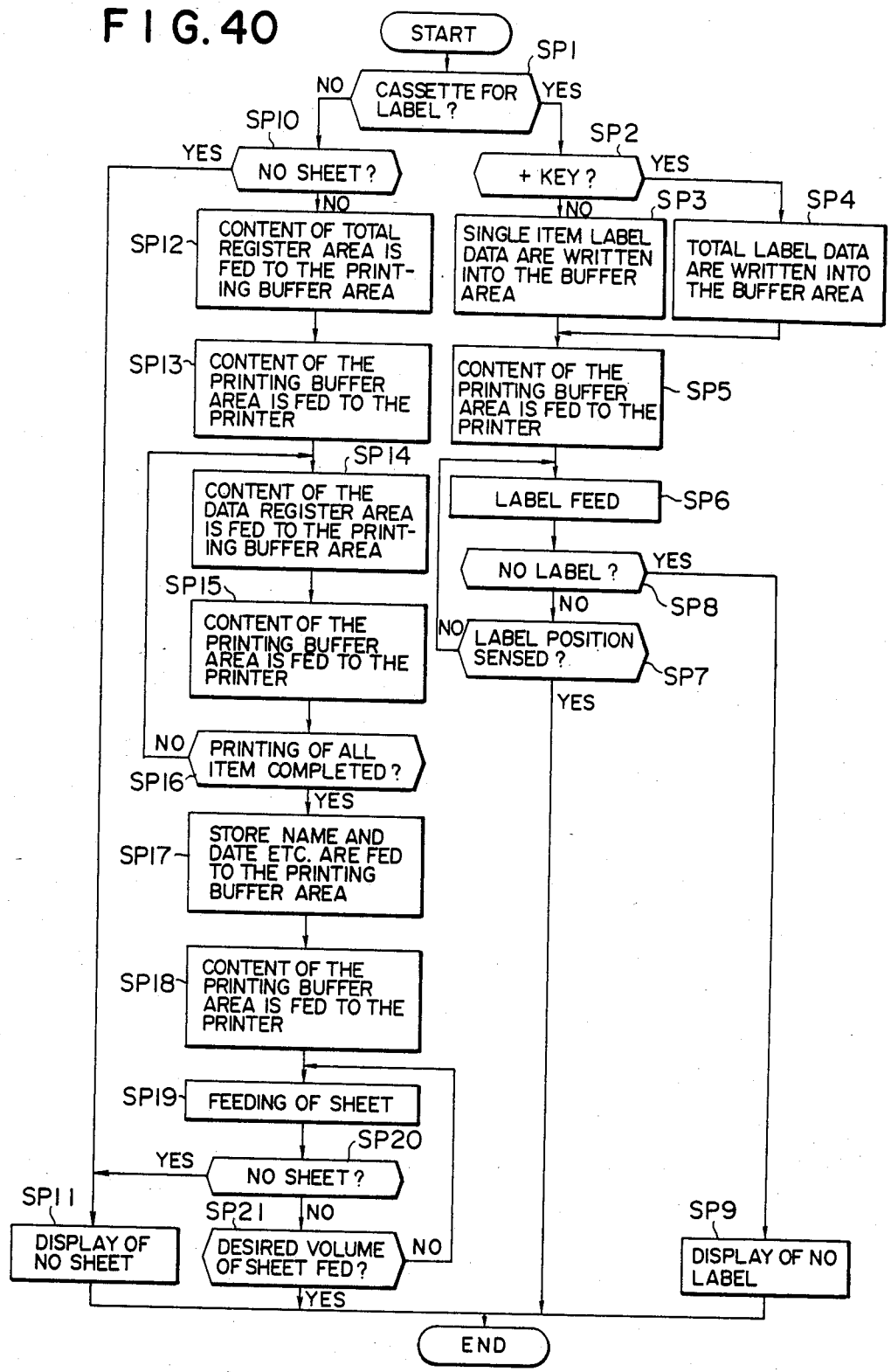
FIG. 40 is a flow chart for illustrating a printing control of an electronic scale.

Thereafter, the print key 81 is depressed and the operation shown in FIG. 40 will be performed.

(2) In case that the receipt cassette 4a is to be used:

In this case, when the sales personnel correctly installs the receipt cassette 4a on the installing part 3 of the main body 1 of the printer, the cassette data are written into the working area EA5 of RAM 59 through CPU57 in the same manner as described above. Then, the sales personnel puts the first item on the weighing pan 11 in a quite same manner as above for the total label printing, inputs the item number, depresses the plus key 82 and then puts the second item on the weighing pan 11, inputs the item number, depresses the plus key 82 and then repeats this process subsequently and finally depresses the plus key 81 upon completion of the operation of depressing plus key for the final item (n-th item). The processing performed by the CPU57 corresponding to each of the above operations is the same as that of the total label printing operation described above.

Thereafter, when the print key 81 is depressed, the processing of the CPU57 is the same as that shown in FIG. 40.

Thus, the case in which the printer of the present invention shown in FIG. 40 issues the label or receipt will be described. Prior to the starting of the printer, the feed key 83 in the function keys 16 shown in FIG. 1 is depressed in advance, and the sensor S3 of the main body 1 of the printer detects the position of the label and detects the presence or absence of the label sheet L and the receipt sheet R in advance.

(1) In case that the label is to be issued:

When the sales personnel depresses the print key 81, the CPU57 advances to the step SP1 shown in FIG. 40 and checks that the above-mentioned data in the working area EA5 are a label cassette 4b and then advances to the step SP2. In the step SP2, the CPU57 judges if the plus key 82 is depressed or not. If the plus key 82 is not depressed (in case of a single item label), the CPU57 advances to the step SP3, and performs a writing operation for the single item label data into the printing buffer area EA1.

That is, the unit price data, appreciation period data and the label printing item name data in the working area EA5 are read out, and each of the read data is transformed into the character pattern with the character patterns in the area EA4 of ROM 58 which is written into the printing buffer area EA1 under the same arrangement as that of the characters when the label printing is to be performed. In turn, when the result of judgement in the step SP2 is "YES" (when the plus key is depressed), the CPU57 advances to the step SP4 to perform a writing of total label data into the printing buffer area EA1. That is, the total data in the total register area EA4-2 are transformed into the character pattern and written into the printing buffer area EA1. In this case, the writing of the unit price and the item name are not written into it.

Then, the CPU57 advances to the step SP5, the content in printing buffer area EA1 is outputted in sequence at the main body 1 of the printer. Thereby, the label printing is performed at the main body 1 of the printer, and for example, the label (single item label in this example) shown in FIG. 39a is automatically issued. Upon completion of the label printing operation, the feeding of the label sheet is performed (step SP6) and the processing is completed upon reaching of the next label to the specified position, i.e. detecting of the slit width m by the sensor S3 (sensing of label position: step SP7).

In the step SP7 described above, when the position of the label is not detected, that is, the slit m is not detected even if the desired amount of sheet is fed, the terminal end m' of the label sheet L is detected and no label condition is detected (step SP8).

When the condition of no label is detected in the step SP8, "YES" is displayed by illuminating the cassette empty light 84 of the display part 12 (step SP9).

(2) In case that the receipt is to be issued:

When the sales personnel depresses the above-mentioned print key 81, the result of judgement in the step SP1 in this case is "NO" and therefore the CPU advances to the step SP10. In the step SP10, the presence or absence of the receipt sheet R is detected by the sensor S3, and when no receipt is found (step SP10-YES), the cassette empty light 84 in the display part 12 is illuminated (step SP11).

In the step SP10, when the presence of the receipt sheet is confirmed (SP10-NO), the CPU advances to the step 12, and in the step SP12, each of the data stored in the total register area EA4-1 and EA4-2 is tansformed into the character pattern and then written into the printing buffer area EA1.

Then, the CPU advances to the step SP13, the content in the printing buffer area EA1 is outputted in sequence to the main body 1 of the printer. Thereby, both the total number of items and the total price are printed on the receipt sheet.

Then the CPU advances to the step SP14, the unit price data, in the n-th line, receipt item name data, weight data, and price data in the data register area EA3 shown in FIG. 38 are read out in sequence and transformed into the character pattern and written into the printing buffer area EA1. Then, the CPU advances to the step SP15, and the content of the printing buffer area EA1 is outputted in sequence to the main body 1 of the printer. Thereby, the unit price, item name, weight and price of the product of the n-th order are printed on the receipt sheet.

Then, the CPU advances to the step SP16, it is judged if the printing of all items written into the data register area EA3 is completed or not. If the result of this judgement is "NO", the CPU returns back to the step SP14, a printing for the item of the (n-1)th order is performed and the above-mentioned process is repeated. When the result of judgement in the step SP16 becomes "YES", the CPU advances to the step SP17. In the step SP17, the store name, date etc. are transformed into the character pattern and written into the printing buffer area EA1 and in the step SP18 the content in the printing buffer is outputted at the main body 1 of the printer and then in the step SP19 the receipt sheet is fed. During feeding of the sheet in the step SP19, the presence or absence of the sheet is detected by the sensor S3 (in the step SP20) and when the condition of no sheet is detected (in the step SP20-YES), the CPU advances to the above-mentioned step SP11 to illuminate the cassette empty light 84 in the display part 12 and in turn when the presence of the sheet is detected (in the step SP20-NO), the desired amount of sheet is fed (in the step SP21), then the processing operation will be finished.

The above-mentioned sheet issuing operation is similarly applied to one item or a plurality of items. When the receipt is to be printed in the above-mentioned preferred embodiment, the system in which the total number of items and the total price are printed in advance compared with that of the item data is employed. The printing order is opposite to that of the receipt which is issued by a usual ECR, and this is employed in relation with the label printing control operation and it is apparent that this invention is not limited to such arrangement as above.

The cassette empty light in the display part 12 is also illuminated when the cassette 4 is not installed at the installing part 3, and is not correctly installed even if it is set in it, i.e. no output signal is produced through the sensor S2.

The above-mentioned preferred embodiment is described and illustrated in reference to the case in which the printer is integrally assembled in the electronic scale and it is apparent that the printer of the present invention can be constructed in separate from the electronic scale and they may be electrically connected to each other.

What is claimed is:

1. An electronic scale printer having a main body electrically connected to an electronic scale, desired data being printed on a printing sheet which is issued said printer, comprising:
   (a) a receipt cassette for storing a receipt printing sheet;
   (b) a label cassette for storing a label printing sheet;
   (c) cassette installing means arranged at the main body of the printer for removably attaching either the receipt cassette or the label cassette to the printer;
   (d) means for discriminating whether the printing sheet stored in the cassette installed in the installing means is the receipt sheet or the label sheet;
   (e) printing control means comprising receipt printing control means and label printing control means for controlling selection of either the receipt printing control means or the label printing control means; and
   (f) printing means for printing the receipt sheet or the label sheet.

2. An electronic scale printer as set forth in claim 1 wherein the main body of the printer is integrally assembled with the electronic scale and electrically connected to the scale.

3. An electronic scale printer as set forth in claim 1 wherein the main body of the printer is made separate from the electronic scale and is electrically connected to the electronic scale.

4. An electronic scale printer as set forth in claim 1 wherein the printing control means comprises:
   (a) a first memory for storing a receipt item name code and a label item name code corresponding to each of a plurality of items in advance;
   (b) a second memory for storing a plurality of character patterns; and
   (c) control means for reading out the receipt item code in response to an issuing instruction when the printing sheet in the cassette is a receipt sheet, transforming the read receipt item name code to one of the plurality of character patterns stored in the second memory and outputting said one of the plurality of character patterns to the printing means, and in turn reading out the label item name code in response to an issuing instruction when the printing sheet is a label sheet, and transforming the read label item name code to one of the plurality of character patterns stored in the second memory and outputting said one of the plurality of character patterns to the printing means.

5. An electronic scale printer as set forth in claim 1 wherein the kind of printing sheet stored in the cassette installed at the installing means is detected by discriminating the kind of cassette installed in the installing part.

6. An electronic scale printer as set forth in claim 5 further comprising through-pass holes provided in either one of the label cassette or the receipt cassette, and wherein the presence or absence of the through-pass holes is detected by reflection type photoelectric sensors for discriminating the kind of cassette.

7. An electronic scale printer as set forth in claim 6 comprising means for opening and closing the through-pass holes provided in the cassette.

8. An electronic scale printer as set forth in claim 1 further comprising sheet sensing means comprising:
   (a) a sensor, arranged in the cassette installing means of the main body of the printer, comprising a light emitting element and light receiving element; and
   (b) a sensing part arranged at a position in the cassette facing the sensor, through which a printing sheet passes before printing thereof, wherein the sensing part comprises reflection means for reflecting a light from the light emitting element at one side of a passing path of the printing sheet across the path toward the direction incident to the light receiving element.

9. An electronic scale printer as set forth in claim 8 in which the reflection means comprises a prism.

10. An electronic scale printer as set forth in claim 8 in which the reflection means comprises two inner mirror surfaces crossing at 90° to each other.

11. An electronic scale printer as set forth in claim 8 wherein the sheet sensing means includes change-over means for automatically varying an output level of the sensor in response to whether the printing sheet installed in the main body of the printer is a receipt printing sheet or a label printing sheet, and wherein the sheet sensing means via operation of the change-over means detects the position of a label and the presence or absence of the receipt sheet.

12. An electronic scale printer as set forth in claim 11 wherein in which the output level adjustment of the sensor is performed when the cassette is installed.

13. An electronic scale printer as set forth in claim 8 wherein the sheet sensing means includes change-over means for varying an output level of the sensor in a step-wise manner and a comparator for comparing an output signal from the sensor with a reference value, wherein the output level of the sensor is set in reference to an output from the comparator when the output level is varied in sequence when the printing sheet installed in the main body of the printer is a label sheet, and the output level is automatically adjusted to a substantially constant value in response to the thickness of the label sheet.

14. An electronic scale printer as set forth in claim 13 wherein in which the output level adjustment of the sensor is performed in reference to a key operation at an operating part.

15. An electronic scale printer as set forth in claim 8 wherein the label cassette is provided with a guide roller capable of varying an installing position along an elongated hole between a sensing part, through which the label sheet passes, and the platen roller, the length of the passing passage of the label sheet is varied under a displacement of position of the guide roller and a sensing means for sensing the position of the guide roller.

16. An electronic scale printer as set forth in claim 1 further comprising:

(a) a source of driving arranged below the installing means of the main body of the printer, an upper surface of the installing means is provided with driving means to be driven by the source of driving;
(b) a platen roller rotatably installed in the cassette; and
(c) power driven means for rotating the roller, arranged outside of the cassette; wherein a driving force for the driving means is transmitted to the platen roller through the driving means and the power driven means when the cassette is installed at the installing means, and transferring of the printing sheet at a specified speed is performed under the rotation of the platen roller.

17. An electronic scale printer as set forth in claim 16 wherein the cassette is removably attached to the installing means by sliding the cassette transversely into the installing means of the main body of the printer.

18. An electronic scale printer as set forth in claim 16 wherein a driving motor is mounted below the cassette installing means of the main body of the printer, the motor shaft of the motor is projected out of an upper surface of the installing means, a driven wheel is attached to the motor shaft, the receipt cassette is provided with a driven wheel engaged with the driving wheel at the shaft of the platen roller, the label cassette is provided with a driven wheel engaged with the driving wheel at the shaft of the platen roller, and power transmitting means is arranged between the shaft and a take-up reel.

19. An electronic scale printer as set forth in claim 16 wherein the stepping motor and DC motor are arranged side-by-side below the cassette installing means of the main body of the printer, motor shafts of both motors are projected out from an upper surface of the installing means, a first driving wheel and a second driving wheel are attached to each of the motor shafts, the receipt cassette is provided with a driven wheel engaged with the first driving wheel at the shaft of the platen roller, the label cassette is provided with a first driven wheel engaged with the first driving wheel at the shaft of the platen roller and is provided with a second driven wheel engaged with the second driving wheel at the shaft of the take-up reel.

20. An electronic scale printer as set forth in claim 16 wherein a driving motor is mounted below the cassette installing means of the main body of the printer, a motor shaft of the motor is projected out of an upper surface of the installing means, a first driving wheel is coaxially attached to the motor shaft, a second driving wheel is arranged through a gear mechanism in a properly spaced relation, the receipt cassette is provided with driven means engaged with the second driving wheel at the shaft of the platen roller, the label cassette is provided with a first driven wheel engaged with first driving wheel at the shaft of take-up reel, and is provided with a second driven wheel engaged with the second driving wheel at the shaft of the platen roller, respectively.

21. An electronic scale printer as set forth in claim 20 or 18 wherein the driving motor is a stepping motor.

22. An electronic scale printer as set forth in claim 21 wherein the driving wheel arranged at the main body of the printer is composed of a first gear coaxially attached to the motor shaft of the driving motor and a second gear engaged with the first gear, and the second gear is slidably arranged along the arcular groove around the motor shaft.

23. An electronic scale printer comprising:
(a) receipt means for storing a plurality of blank receipt sheets;
(b) label means for storing a plurality of blank label sheets;
(c) means for removably attaching said receipt means and said label means to said electronics scale printer;
(d) detecting means for generating a first signal when said receipt means is attached to said electronic scale printer and for generating a second signal when said label means is attached to said electronic scale printer;
(e) printer control means operatively connected to a printer whereby a receipt is printed on one of said plurality of blank receipt sheets when said first signal is generated and a label is printed on one of said plurality of blank label sheets when said second signal is generated.

24. An electronic scale printer according to claim 23 further comprising an electronic scale electrically connected to said electronic scale printer for weighing an item.

25. An electronic scale printer according to claim 24 wherein said printer control means comprises:
(a) first memory means for storing a predetermined receipt item name code and a predetermined label item name code corresponding to each of a plurality of items;
(b) second memory means for storing a plurality of character patterns corresponding to each of said predetermined receipt item name codes and said predetermined label item name codes stored in said first memory means;
(c) control means for controlling said printer said control means operating in a first operating mode responsive to an issuing instruction and said first signal, said control means operating in a second operating mode responsive to an issuing instruction and said second signal.

26. An electronic scale printer according to claim 25 wherein:
(a) said first operating mode comprises reading one of said predetermined receipt item name codes from said first memory means corresponding to one of said plurality of items, reading one of said plurality of character patterns from said second memory means corresponding to said one of said predetermined receipt item name codes, and outputting said one of said plurality of character patterns to said printer; and
(b) said second operating mode comprises reading one of said predetermined label item name codes from said first memory means corresponding to one of said plurality of items, reading one of said plurality of character patterns from said second memory meanscorresponding to said one of said predetermined receipt item name codes and outputting said one of said plurality of character patterns to said printer.

27. An electronic scale printer according to claim 24 wherein:
(a) said means for removably attaching said receipt means and said label means comprises said detecting means; and (b) said detecting means comprises at least one photoelectric sensor for sensing at least one hole.

28. An electronic scale printer according to claim 27 wherein said at least one hole is located on said receipt means.

29. An electronic scale printer according to claim 27 wherein said at least one hole is located on said label means.

30. A method for operating an electronic scale printer comprising the steps of:
 (a) generating a first signal responsive to detecting means when means for storing a plurality of blank receipt sheets is attached to said electronic scale printer;
 (b) generating a second signal responsive to said detecting means, when means for storing a plurality of blank label sheets is attached to said electronic scale printer;
 (c) printing receipt data on one of said plurality of blank receipt sheets in response to generation of said first signal and an issuing instruction; and
 (d) printing label data on one of said plurality of blank label sheets in response to generation of said second signal and an issuing instruction.

31. A method according to claim 30 wherein the step of printing receipt data comprises the steps of:
 (a) reading one of a plurality of receipt item name codes from a first memory means corresponding to one of a plurality of items;
 (b) reading one of a plurality of character patterns from a second memory means corresponding to said one of said plurality of receipt item name codes; and
 (c) outputting said one of said plurality of character patterns on printing means.

32. A method according to claim 30 wherein the step of printing label data comprises the steps of:
 (a) reading one of a plurality of label item name codes from a first memory means corresponding to one of a plurality of items;
 (b) reading one of a plurality of character patterns from a second memory means corresponding to said one of said plurality of label item name codes; and
 (c) outputting said one of said plurality of character patterns on printing means.

* * * * *